United States Patent
Zhou et al.

(10) Patent No.: US 11,190,384 B2
(45) Date of Patent: Nov. 30, 2021

(54) ELECTRONIC DEVICE AND COMMUNICATION METHOD

(71) Applicant: Sony Corporation, Tokyo (JP)

(72) Inventors: Zhengyi Zhou, Beijing (CN); Zhaocheng Wang, Beijing (CN); Ning Ge, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/054,513

(22) PCT Filed: Jun. 3, 2019

(86) PCT No.: PCT/CN2019/089801
§ 371 (c)(1),
(2) Date: Nov. 10, 2020

(87) PCT Pub. No.: WO2019/233373
PCT Pub. Date: Dec. 12, 2019

(65) Prior Publication Data
US 2021/0194742 A1    Jun. 24, 2021

(30) Foreign Application Priority Data
Jun. 4, 2018  (CN) .......................... 201810563647.3

(51) Int. Cl.
*H04L 27/00*  (2006.01)
*H04L 27/26*  (2006.01)

(52) U.S. Cl.
CPC ............................... *H04L 27/2639* (2013.01)

(58) Field of Classification Search
CPC ................................................. H04L 27/2639
(Continued)

(56) References Cited

U.S. PATENT DOCUMENTS

| 2009/0297144 A1* | 12/2009 | Djordevic | H04L 25/067 398/39 |
| 2010/0329544 A1* | 12/2010 | Sabe | G06K 9/6256 382/159 |
| 2015/0327085 A1* | 11/2015 | Hadani | H04L 5/0007 370/252 |

FOREIGN PATENT DOCUMENTS

| CN | 106716825 A  *  5/2017 ....... H04L 25/03159 |
| CN | 106716825 A       5/2017 |

(Continued)

OTHER PUBLICATIONS

Peng Xu and Jinkuan Wang, Feng Qi , High effective MAP algorithm for MIMO-OFDM systems,2009, Second International Conference on Intelligent Computation Technology and Automation (Year: 2009).*

(Continued)

*Primary Examiner* — Tanmay K Shah
(74) *Attorney, Agent, or Firm* — Xsensus LLP

(57) ABSTRACT

An electronic device and communication method are disclosed. The electronic device comprises a processing circuit configured to perform a pre-processing operation on a first one-dimensional sequence of modulation symbols, the pre-processing operation including: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the (Continued)

dimension-decreasing conversion is an inverse process of the dimension-increasing conversion. The processing circuit is also configured to transmit the second one-dimensional sequence of modulation symbols.

20 Claims, 21 Drawing Sheets

(58) Field of Classification Search
USPC .......................................................... 375/295
See application file for complete search history.

(56) References Cited

FOREIGN PATENT DOCUMENTS

| CN | 107819709 A | * | 3/2018 | | |
|---|---|---|---|---|---|
| CN | 107819709 A | | 3/2018 | | |
| CN | 107925446 A | * | 4/2018 | ......... | H04L 27/2697 |
| CN | 107925446 A | | 4/2018 | | |
| WO | 2016/014596 A1 | | 1/2016 | | |
| WO | 2016/183240 A1 | | 11/2016 | | |
| WO | WO-2016209848 A1 | | 12/2016 | | |

OTHER PUBLICATIONS

International Search Report and Written Opinion dated Aug. 22, 2019 for PCT/CN2019/089801 filed on Jun. 3, 2019, 8 pages including English Translation of the International Search Report.

* cited by examiner

ELECTRONIC DEVICE AND COMMUNICATION METHOD

CROSS-REFERENCE TO RELATED APPLICATIONS

This application is based on PCT filing PCT/CN2019/089801, filed Jun. 3, 2019, which claims priority to Chinese Patent Application No. 201810563647.3 filed on Jun. 4, 2018, the contents of each are referenced hereby in its entirety as a part of this application.

TECHNICAL FIELD

The present disclosure relates to an electronic device and a communication method, and in particular, to an electronic device and a communication method with improved performance in high-speed mobile scenarios.

BACKGROUND

Wireless communication has increasingly expanding application scenarios, and is increasingly applied to high-speed mobile scenarios such as aircraft, high-speed rail and satellite communications. In such high-speed mobile scenarios, a physical channel has a fast time-varying characteristic, and the Doppler Effect brought by the fast time-varying physical channel has a non-negligible impact on the performance of a wireless communication system.

In most existing broadband wireless communication systems, for example, Orthogonal Frequency Division Multiplexing (OFDM) modulation is a major modulation scheme employed for downlink transmission, which employs multiple frequency domain subcarriers allocated in advance to transmit a group of complex modulation symbols. The use of multiple frequency domain subcarriers, however, makes the OFDM system to be very sensitive to Doppler frequency offset. Therefore, the strong Doppler Effect brought by the fast time-varying physical channel will seriously deteriorate the performance of the OFDM system and greatly increase the bit error rate. This limits the application of OFDM systems in high-speed mobile scenarios.

In order to counter the strong Doppler effect of the fast time-varying physical channel, some new modulation and multiple access technologies have been proposed, such as Orthogonal Time Frequency Space Modulation (OTFS). OTFS modulation obtains a diversity gain for countering Doppler frequency offset by processing multiple groups of complex modulation symbols within multiple OFDM symbol intervals. However, OTFS modulation requires joint processing on all complex modulation symbols within multiple OFDM symbol intervals, which not only brings high computational overhead, but also inevitably causes endogenous system delay. The high complexity of OTFS modulation/demodulation and the endogenous system delay make it unsuitable for implementation on practical systems such as handheld mobile devices.

SUMMARY

The present disclosure provides an improved communication method and electronic device suitable for high-speed mobile scenarios, which can effectively cope with the time-varying Doppler Effect in high-speed mobile scenarios, while at the same time having lower implementation complexity and system delay, facilitating to implement in an actual system.

An aspect of the present disclosure relates to an electronic device including a processing circuit configured to perform a pre-processing operation on a first one-dimensional sequence of modulation symbols. The pre-processing operation includes: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the dimension-decreasing conversion is an inverse process of the dimension-increasing conversion. The processing circuit is further configured to transmit the second one-dimensional sequence of modulation symbols.

Another aspect of the present disclosure relates to an electronic device including a processing circuit configured to: acquire a first one-dimensional sequence of modulation symbols; and perform a post-processing operation on the first one-dimensional sequence of modulation symbols, the post-processing operation including: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the dimension-decreasing conversion is an inverse process of the dimension-increasing conversion.

Another aspect of the present disclosure relates to a communication method including performing a pre-processing operation on a first one-dimensional sequence of modulation symbols, wherein the pre-processing operation including: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the dimension-decreasing conversion is an inverse process of the dimension-increasing conversion. The communication method also includes transmitting the second one-dimensional sequence of modulation symbols.

Yet another aspect of the present disclosure relates to a communication method including: acquiring a first one-dimensional sequence of modulation symbols; and performing a post-processing operation on the first one-dimensional sequence of modulation symbols, wherein the post-processing operation including: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the dimension-decreasing conversion is an inverse process of the dimension-increasing conversion.

Yet further another aspect of the present disclosure relates to a communication method including performing a pre-processing operation on a first one-dimensional sequence of modulation symbols, the pre-processing operation including: performing a first dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a first dimension-decreasing conversion to convert the second multi-dimensional modulation symbol block into a second one-dimensional sequence of modulation symbols, wherein the first dimension-decreasing conversion is an inverse process of the first dimension-increasing conversion. The communication method further includes transmitting the second one-dimensional sequence of modulation symbols, acquiring the second one-dimensional sequence of modulation symbols; and performing a post-processing operation on the second one-dimensional sequence of modulation symbols. The post-processing operation includes: performing a second dimension-increasing conversion to convert the second one-dimensional sequence of modulation symbols into a third multi-dimensional modulation symbol block; transforming the third multi-dimensional modulation symbol block into a forth multi-dimensional modulation symbol block with a second transformation, wherein the second transformation couples each symbol in the third multi-dimensional modulation symbol block with each other; and performing a second dimension-decreasing conversion to convert the forth multi-dimensional modulation symbol block into a third one-dimensional sequence of modulation symbols, wherein the second dimension-decreasing conversion is an inverse process of the second dimension-increasing conversion.

Yet another aspect of the present disclosure relates to a computer-readable storage medium having a computer program stored thereon, characterized in that, the computer program, when loaded and executed by a processor, used to embody the aforementioned communication methods.

According to various aspects of the present disclosure, by introducing pre-processing and post-processing operations on the transmitting side and the receiving side, respectively, it is able to effectively cope with the time-varying Doppler effect in high-speed mobile scenarios, while at the same time having lower implementation complexity and system delay, thereby obtaining an improved communication method and electronic device as well as providing a kind of new waveform.

DRAWINGS

The above and other objects and advantages of the present disclosure will be further described below in conjunction with specific embodiments and with reference to the accompanying drawings. In the drawings, the same or corresponding technical features or components will be denoted by the same or corresponding reference signs.

FIGS. 1A-1C schematically depict an OFDM system.

FIG. 1D schematically depicts a plurality of complex modulation symbol sequences for a transmitting side of an OFDM system.

Figure 4A:
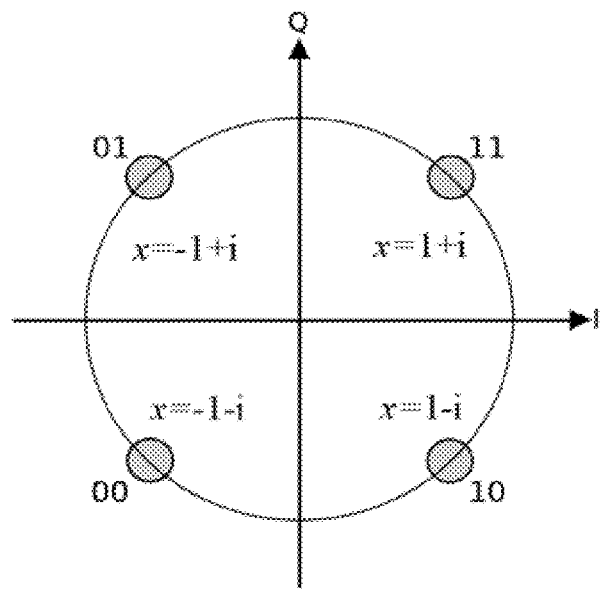
FIG. 4A shows a constellation diagram of QPSK modulation.
Figure 4B:
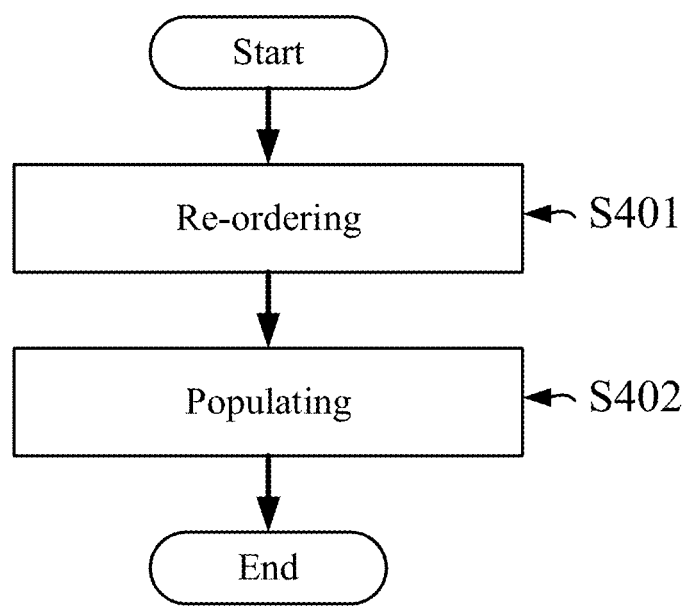
FIG. 4B shows a flowchart of a first dimension-increasing conversion according to an embodiment of the present disclosure.
Figure 4C:
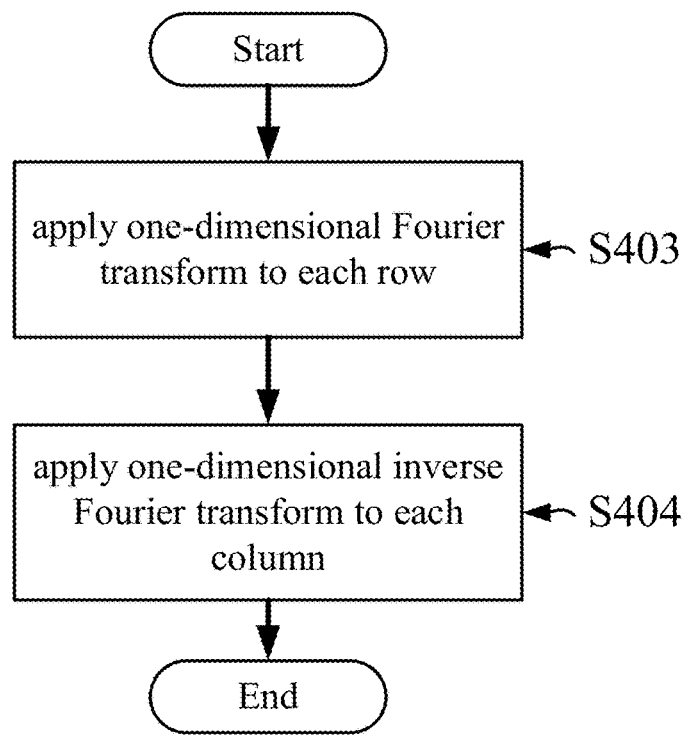
FIG. 4C shows a flowchart of a first coupling transformation according to an embodiment of the present disclosure.
Figure 4D:
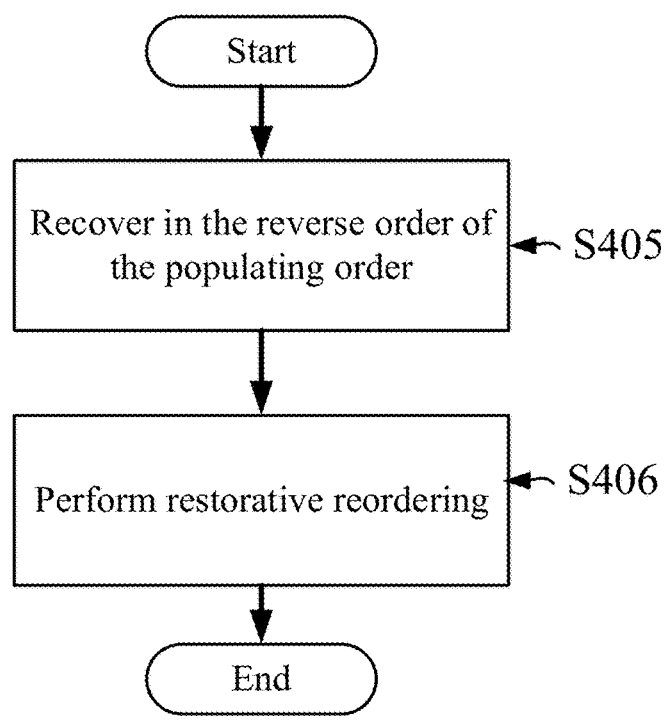
FIG. 4D shows a flowchart of a first dimension-decreasing conversion according to an embodiment of the present disclosure.
Figure 4E:
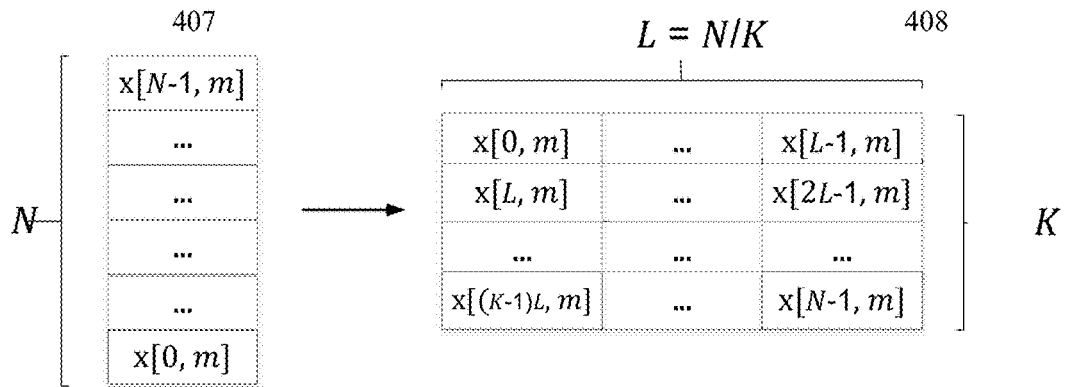
Figure 4F:
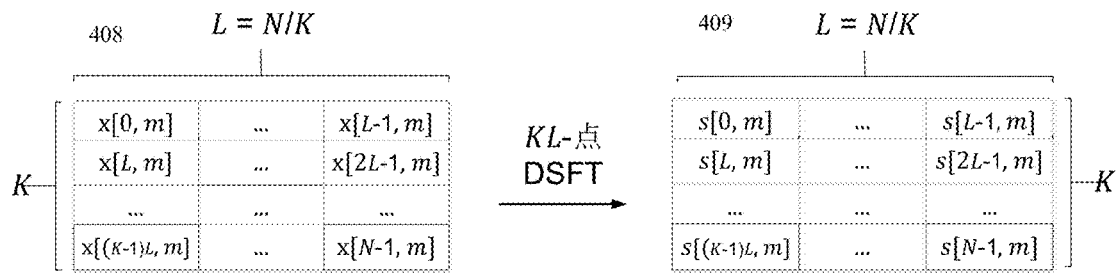
Figure 4G:
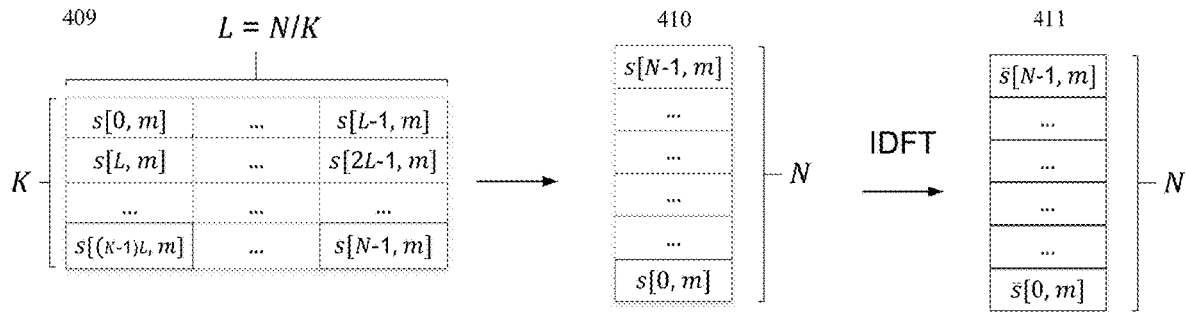

FIGS. 4E-4G respectively show schematic diagrams of a first dimension-increasing conversion, a first coupling transformation, and a first dimension-decreasing conversion according to an embodiment of the present disclosure.

Figure 5:
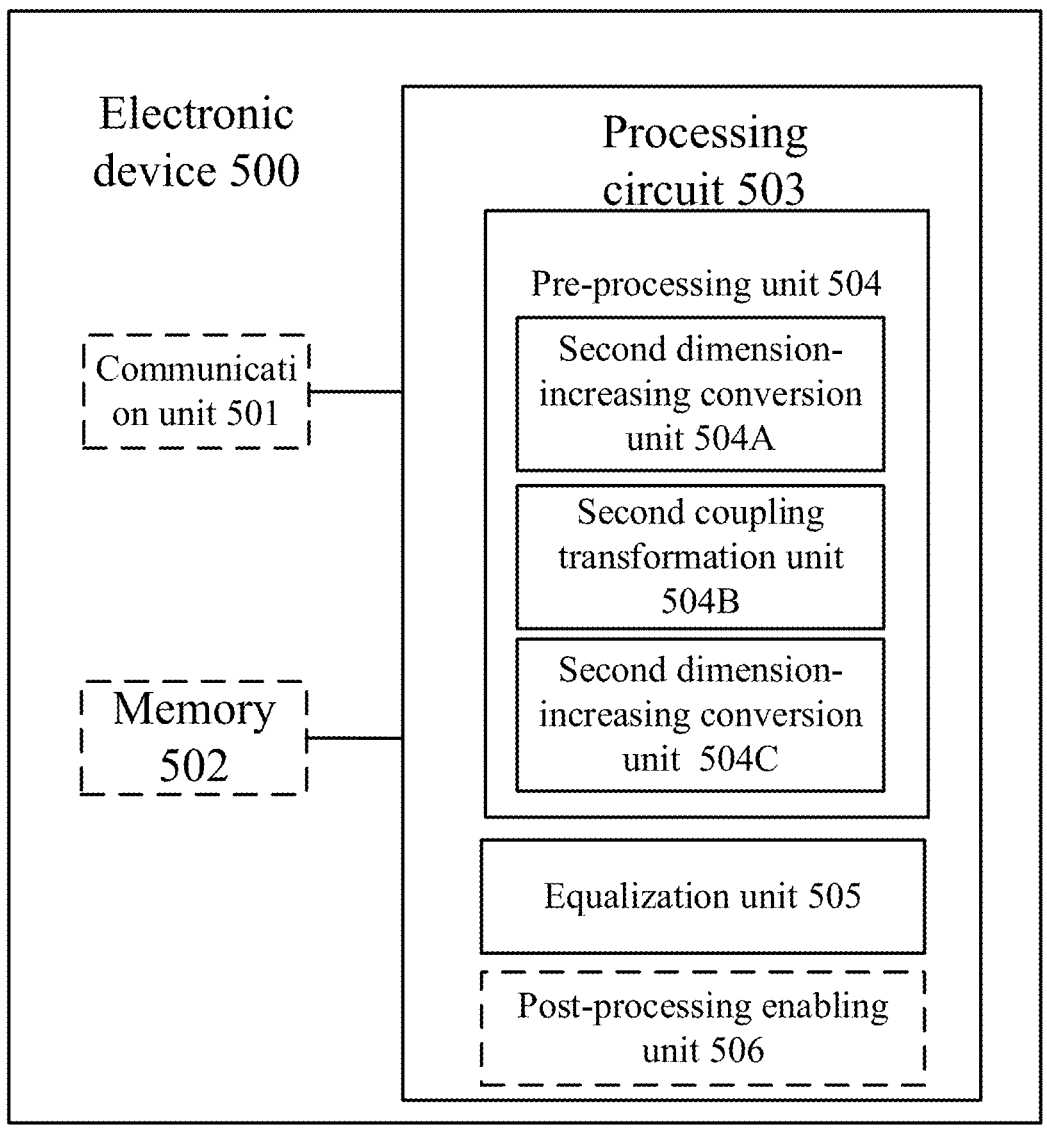

FIG. 5 shows a block diagram of an electronic device for a receiving side according to an embodiment of the present disclosure.

Figure 6:
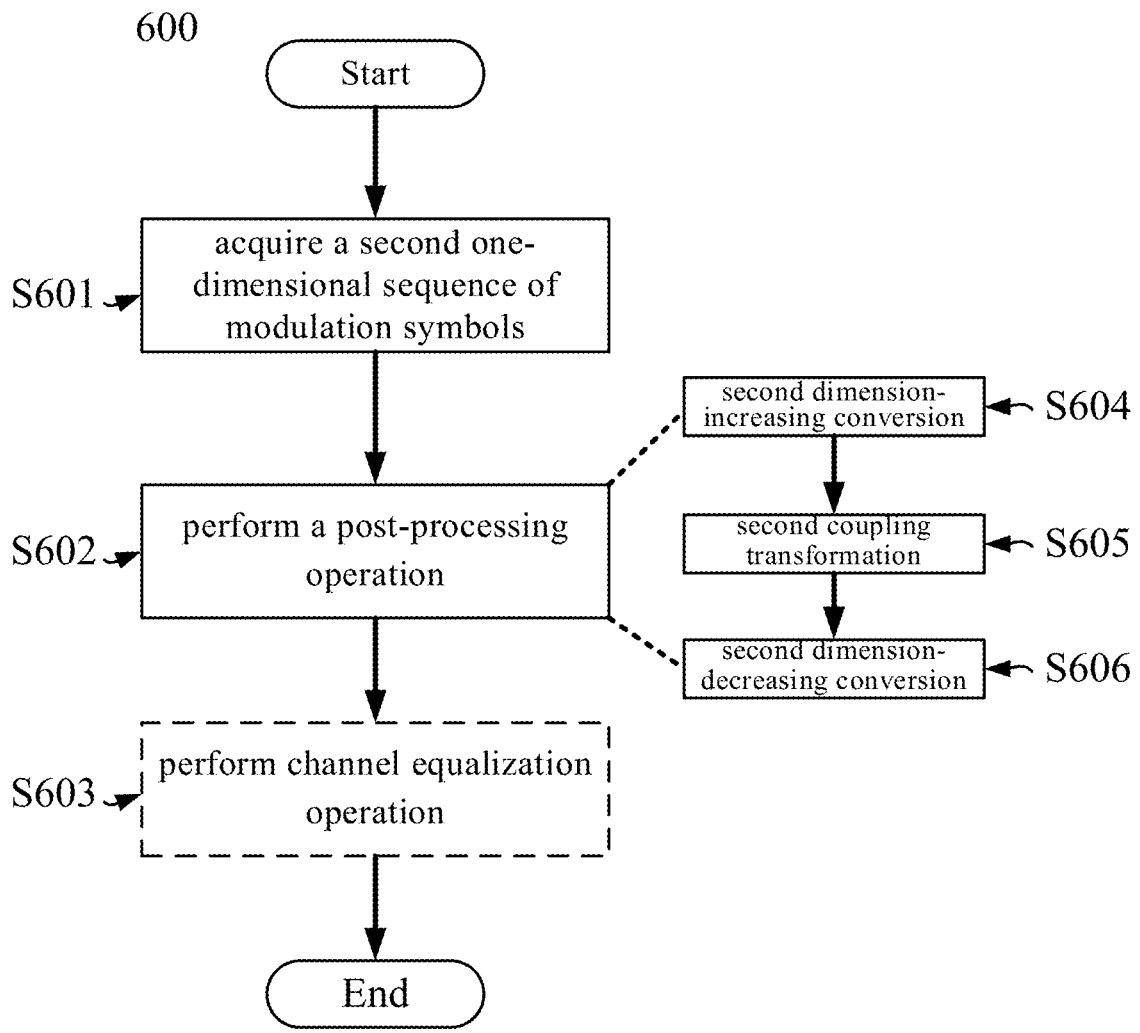

FIG. 6 shows a flowchart of a communication method for an electronic device for a receiving side according to an embodiment of the present disclosure.

Figure 7A:
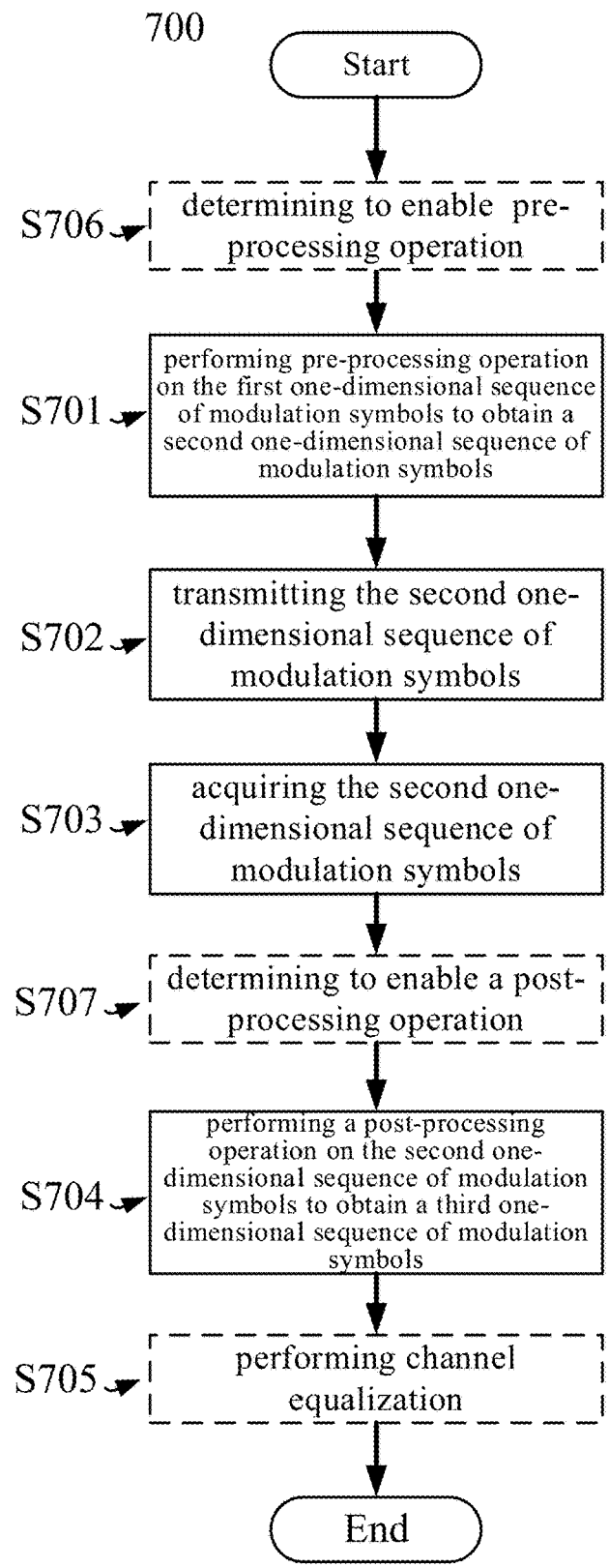

FIG. 7A shows a flowchart of a general communication method according to an embodiment of the present disclosure.

Figure 7B:
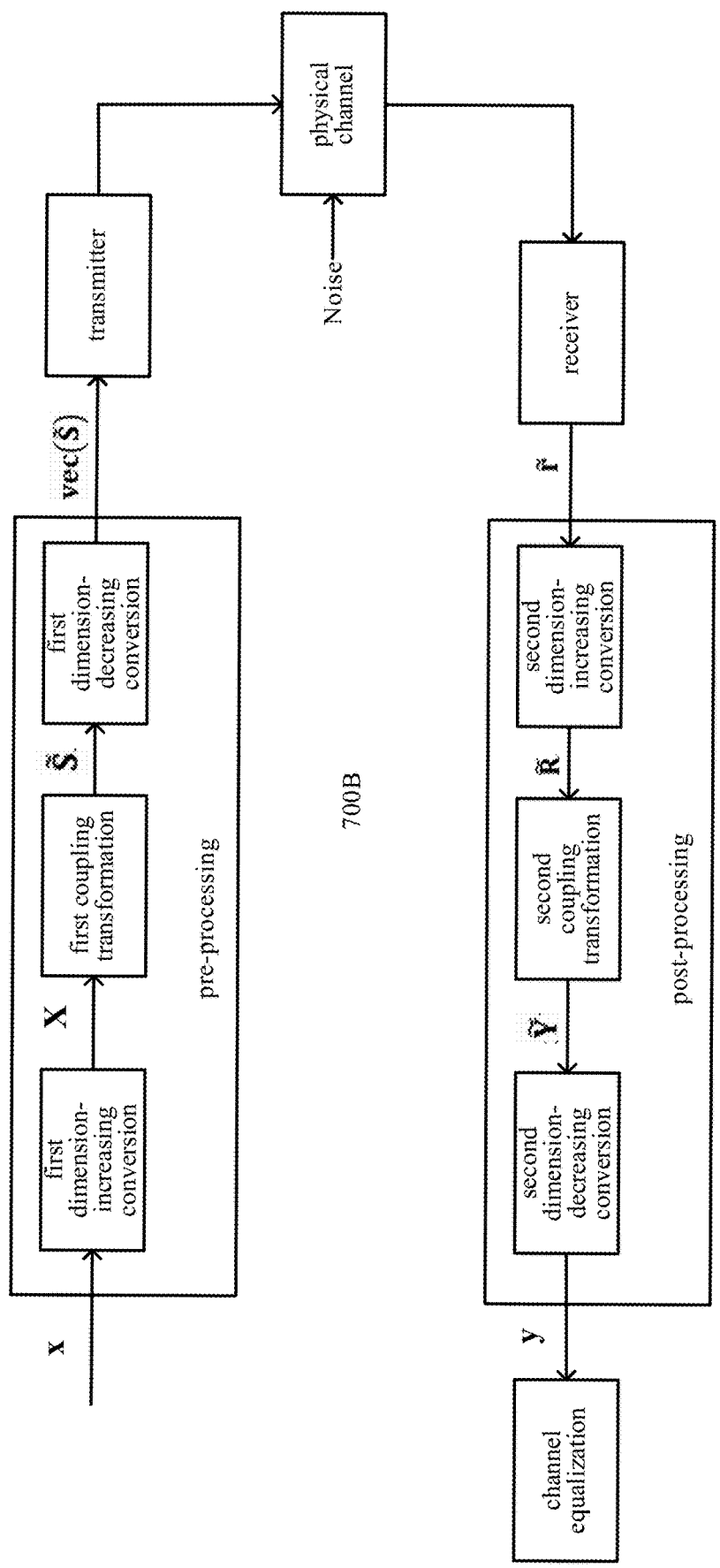

FIG. 7B shows a block diagram of a communication system according to an embodiment of the present disclosure.

Figure 7C:
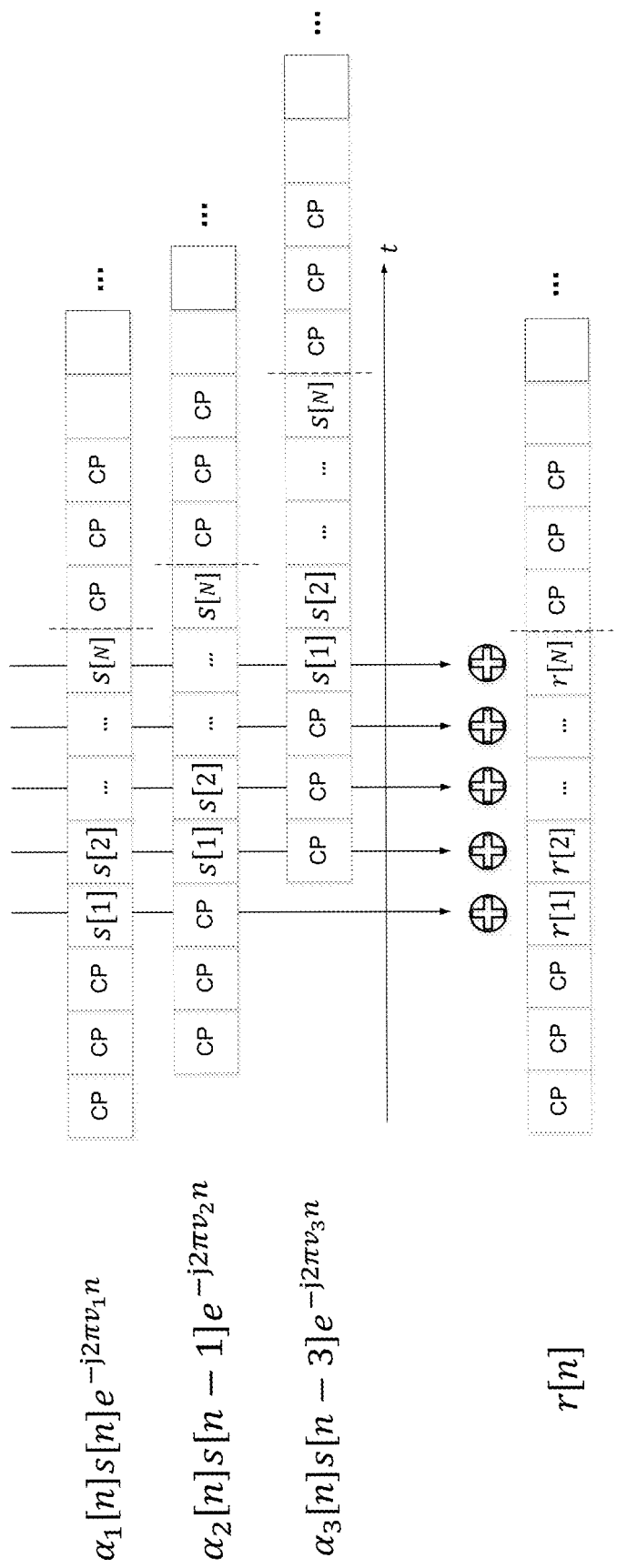

FIG. 7C shows a schematic diagram of a digital signal model at the transmitting and receiving ends under a time-varying multipath physical channel according to an embodiment of the present disclosure.

Figure 8A:
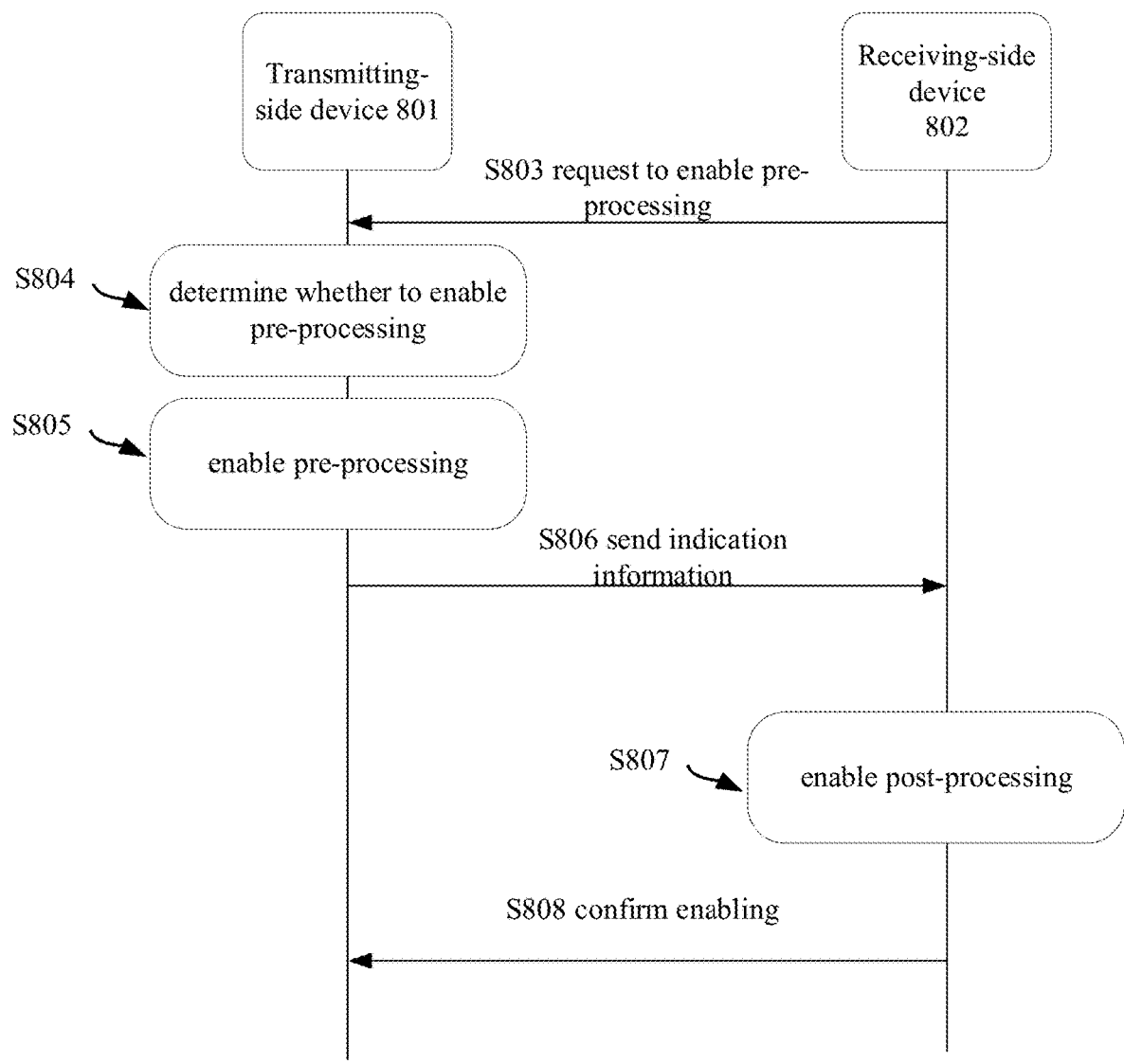
Figure 8B:
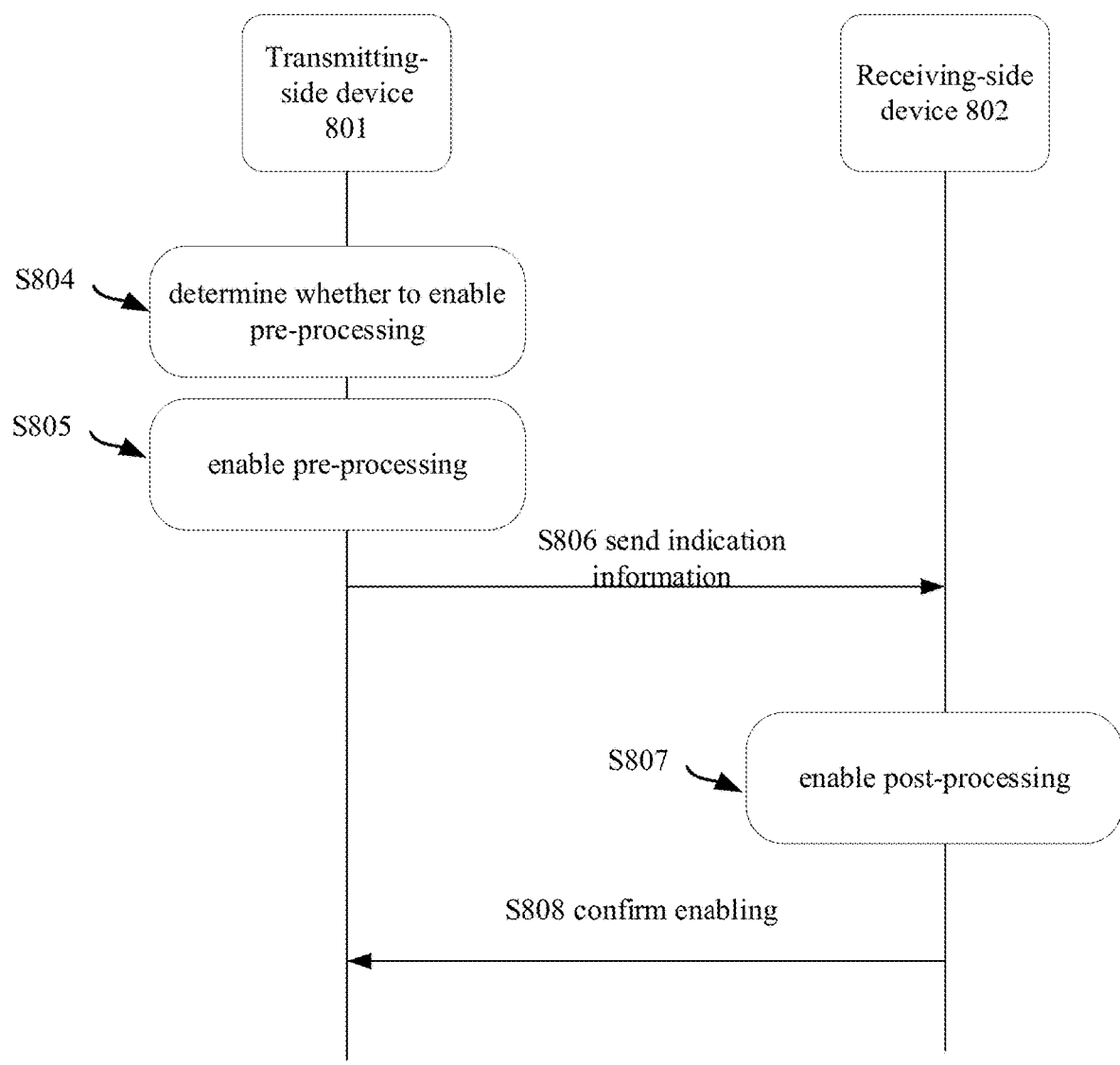

FIGS. 8A and 8B show schematic diagrams for determining whether to enable a pre-processing operation and/or a post-processing operation according to an embodiment of the present disclosure.

Figure 9:
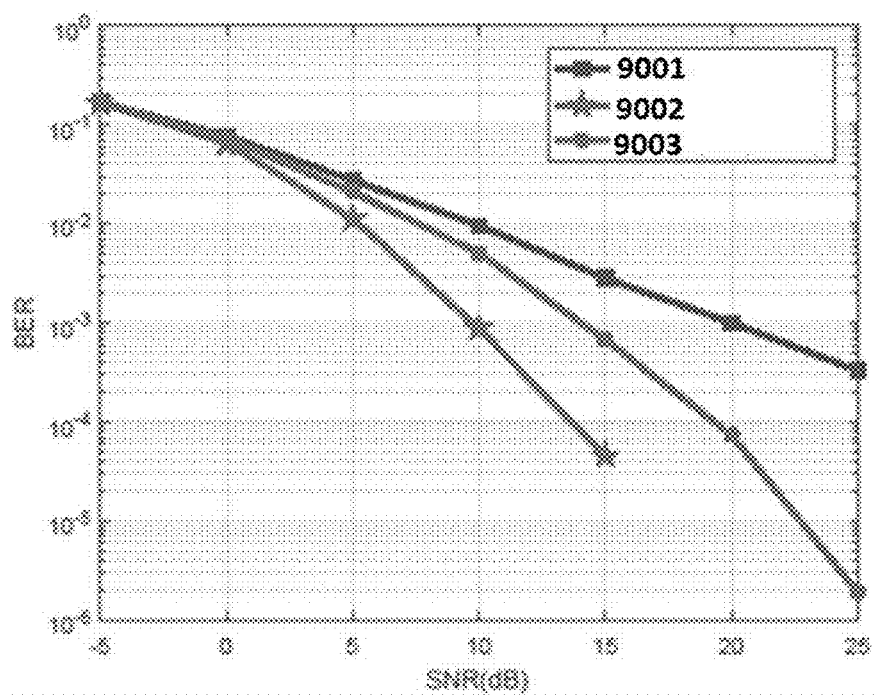
Figure 10:
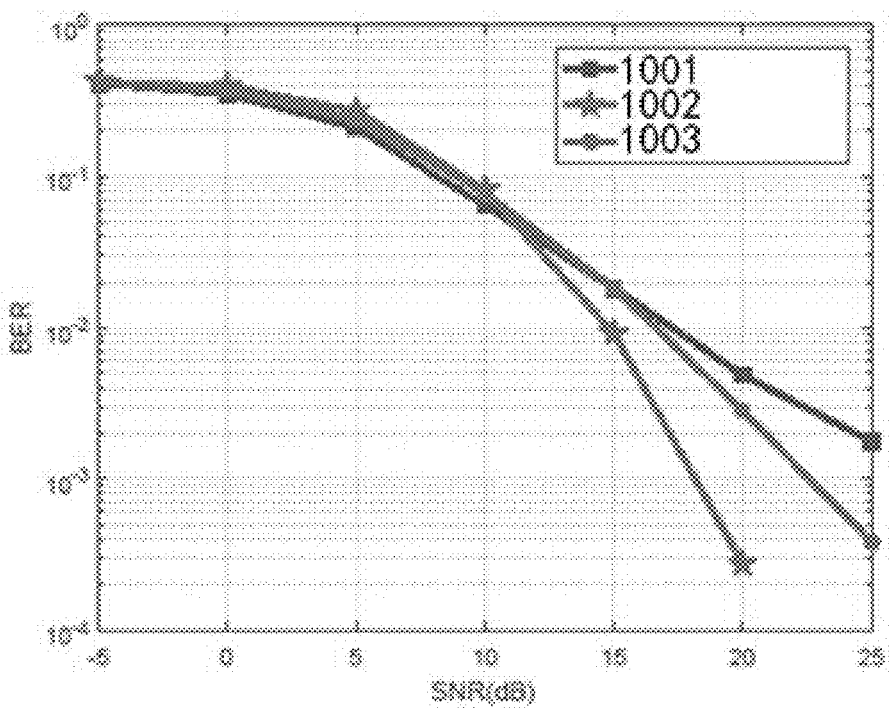

FIGS. 9 and 10 show the simulation results of the bit error rate performance of each system in the case of using QPSK constellation and 16 QAM constellation for constellation point mapping, respectively.

Figure 11:
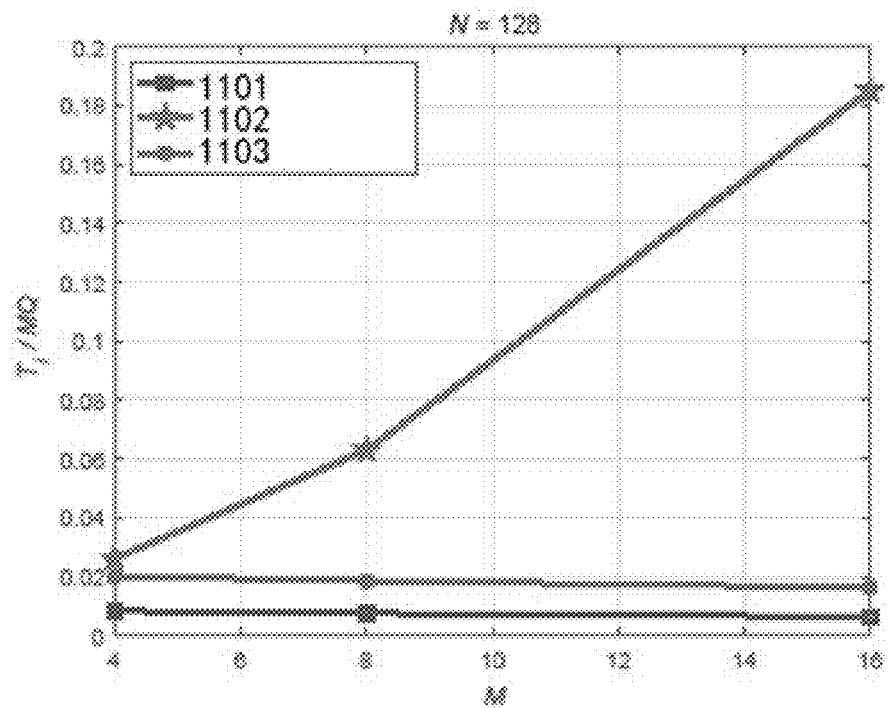
Figure 12:
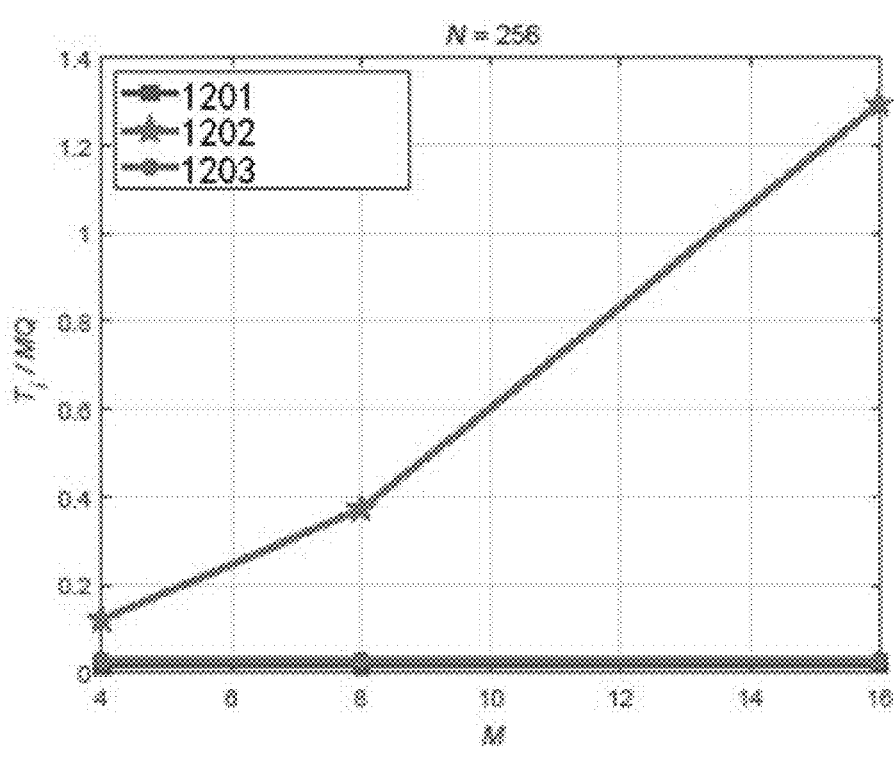

FIGS. 11 and 12 show the average times of running of program modules for simulating each system in the case of using N=128 subcarriers and N=256 subcarriers, respectively.

Figure 13:
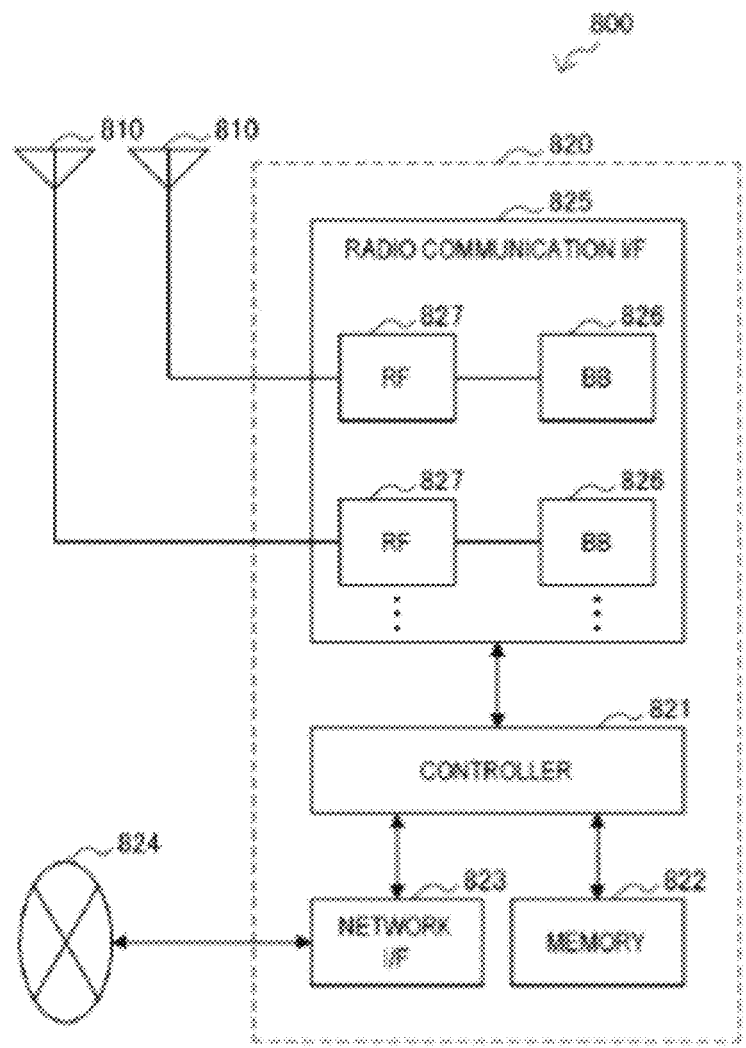

FIG. 13 is a block diagram of a first example of a schematic configuration of an electronic device on a control device-side according to an embodiment of the present disclosure.

Figure 14:
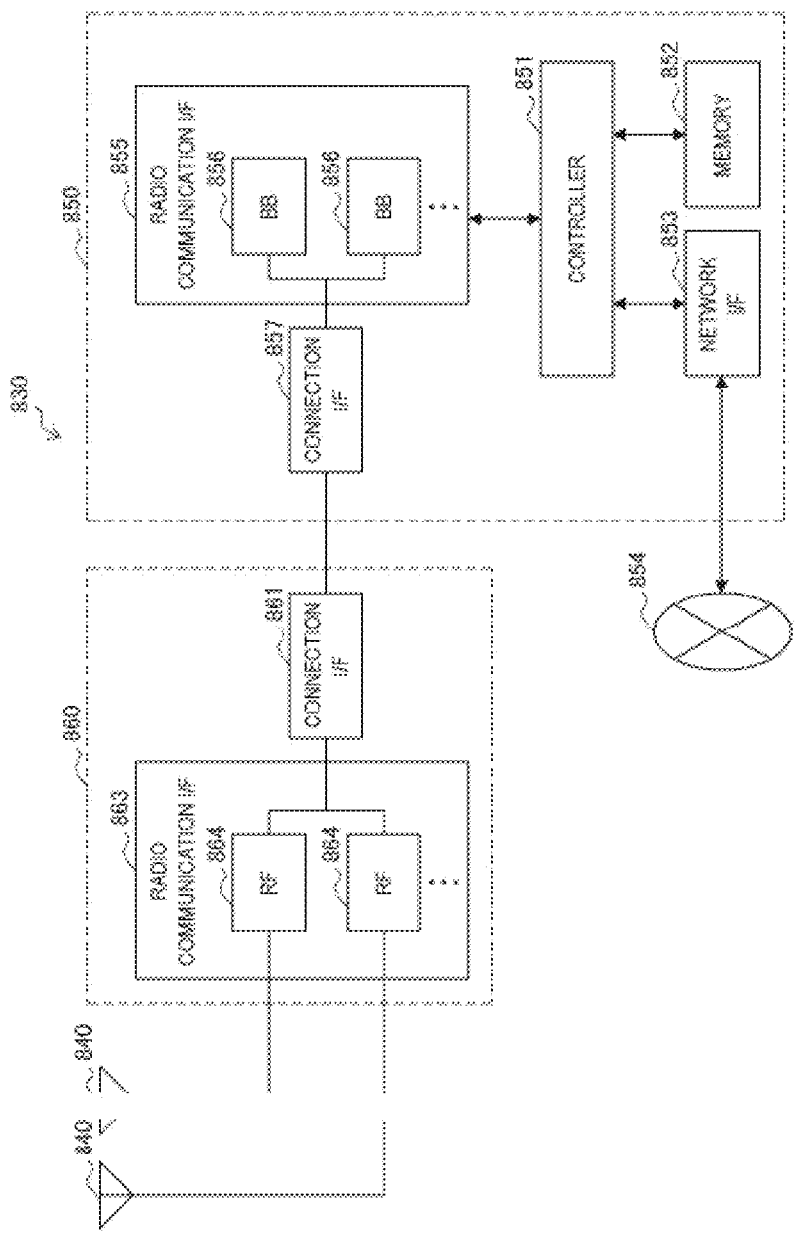

FIG. 14 is a block diagram of a second example of a schematic configuration of an electronic device on a control device-side according to an embodiment of the present disclosure.

Figure 15:
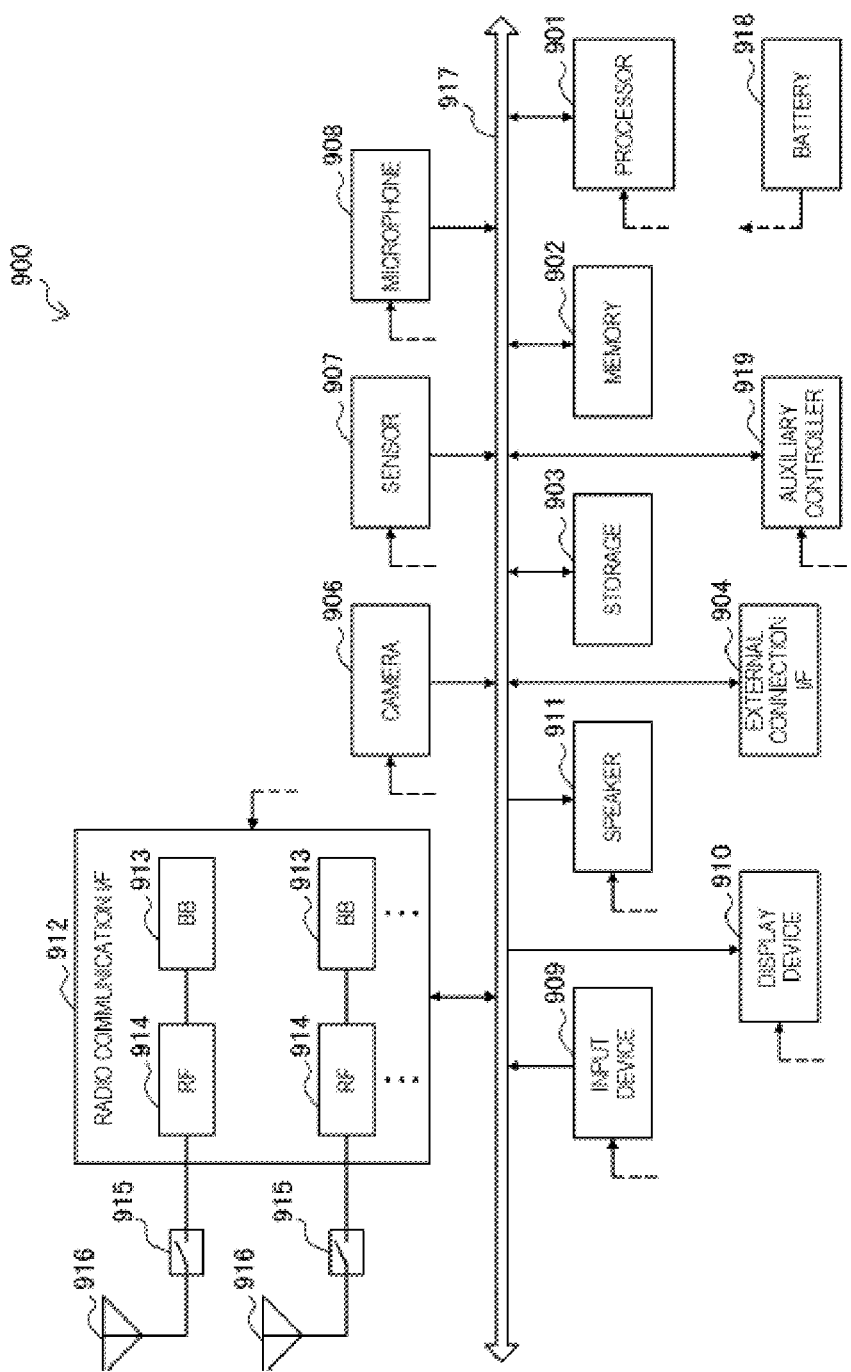

FIG. 15 is a block diagram of an example of a schematic configuration of a smartphone according to an embodiment of the present disclosure.

Figure 16:
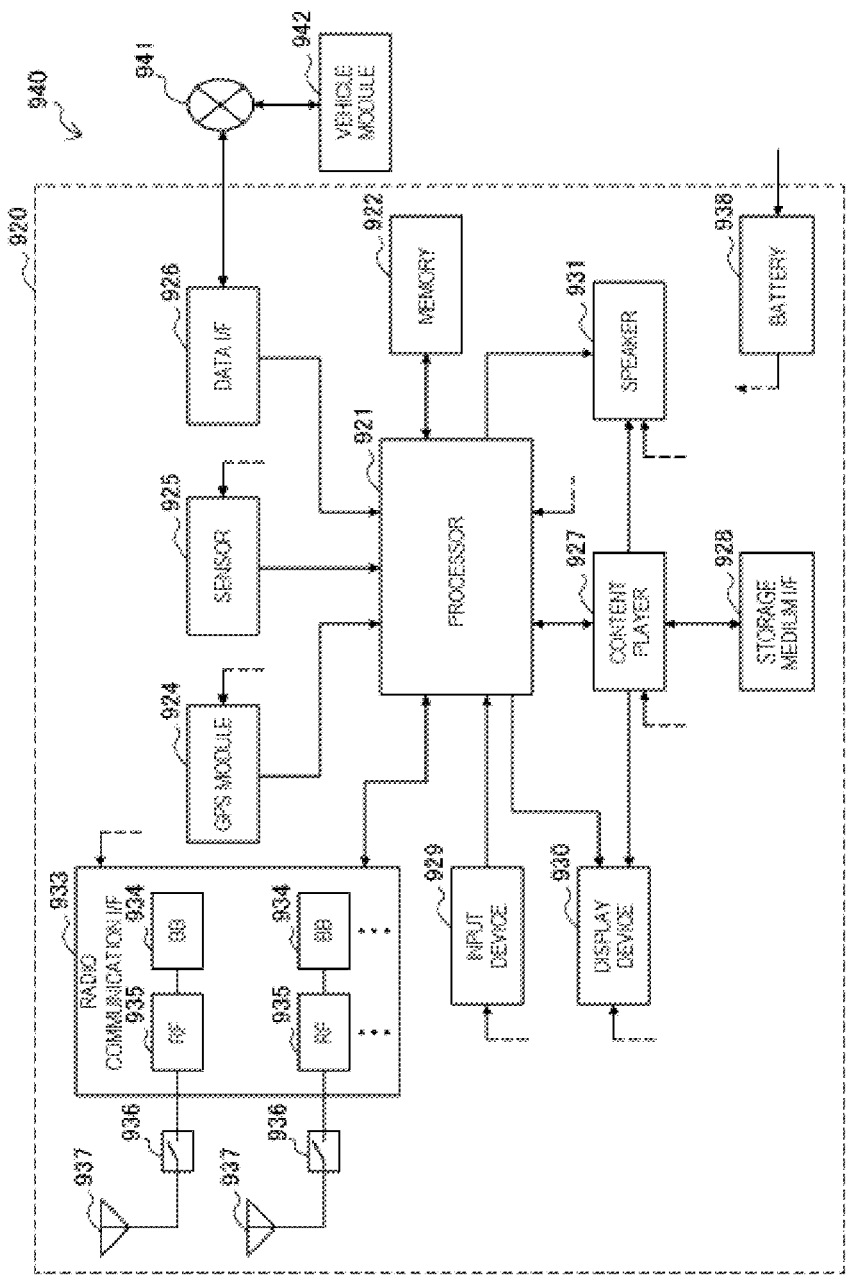

FIG. 16 is a block diagram of an example of a schematic configuration of a car navigation device according to an embodiment of the present disclosure.

DETAILED DESCRIPTION

Hereinafter, exemplary embodiments of the present disclosure will be described with reference to the drawings. For the purpose of clarity and conciseness, not all features of the embodiments are described in the specification. However, it should be understood that many implementation-specific settings must be made during the implementation of the embodiments in order to achieve the specific goals of the developer, for example, to meet those restrictions related to devices and businesses, and these restrictions may vary from implementation to implementation. In addition, it should also be understood that, although development work may be very complicated and time-consuming, for those skilled in the art who benefit from the present disclosure, such development work is merely a routine task.

Here, it should also be noted that, in order to avoid obscuring the disclosure with unnecessary details, only the processing steps and/or device structures closely related to at least the solution according to the disclosure are shown in the drawings, and other details not so relevant to the present disclosure are omitted.

Next, the description will be made in the following order.
1. Traditional OFDM System As mentioned earlier, OFDM modulation is a major modulation scheme. Therefore, first, a brief introduction to the traditional OFDM system will be made with reference to FIGS. 1A-1C, so as to facilitate understanding of subsequent descriptions based on OFDM. However, it should be understood that the OFDM system is only an example, and the present disclosure can also be applied to other similar systems, as described in section 9 below. The OFDM system is a multi-carrier modulation system adopted by, for example, a LTE system, and is characterized in that multiple subcarriers can be used within one symbol interval to transmit respectively the corresponding complex modulation symbol in a group of complex modulation symbols. These subcarriers are orthogonal to each other and can overlap, and the number of subcarriers used is equal to the number of symbols in a group of complex modulation symbols transmitted within one symbol interval. Therefore, utilizing protective bandwidths to separate the carriers is avoided, so that the OFDM system has higher spectrum utilization.

Figure 1A:
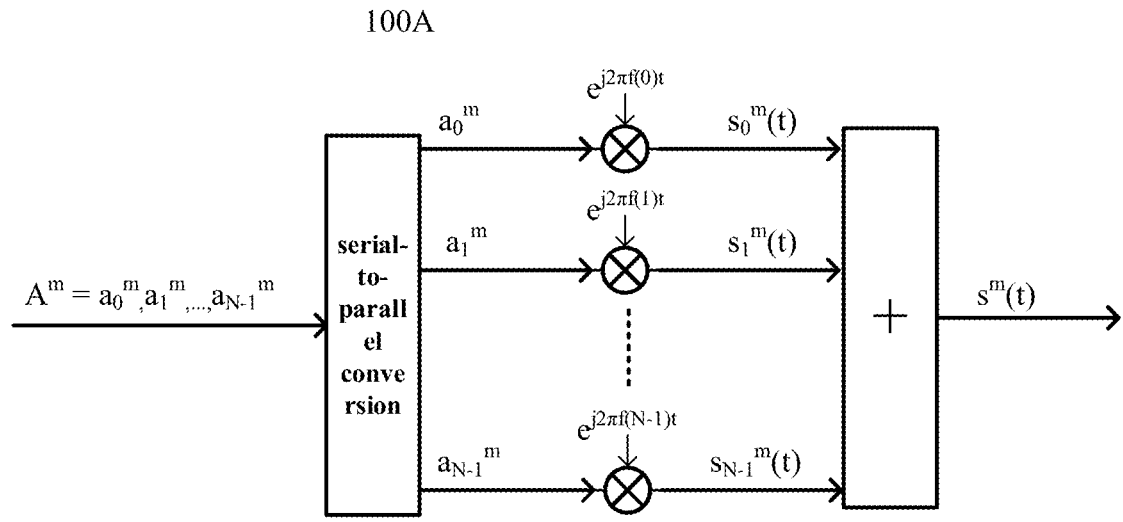

FIG. 1A provides a schematic description for an OFDM modulator 100A, in which N complex modulators are shown, each complex modulator corresponding to one OFDM subcarrier.

With the complex baseband representation, the OFDM modulator 100A obtains a basic OFDM signal $s^m(t)$ from an input complex modulation symbol sequence $A^m$ for a single OFDM symbol interval.

As the input to the OFDM modulator 100A, the complex modulation symbol sequence $A^m$ represents a group of complex modulation symbols $a_0^m, a_1^m, \ldots, a_{N-1}^m$ to be transmitted within one OFDM symbol interval (as an example, the m-th OFDM symbol interval). These complex modulation symbols are, for example, QPSK symbols or QAM symbols, depending on the modulation method. The bit stream to be transmitted can be mapped to constellation points by utilizing techniques such as QPSK, 16 QAM or 64 QAM, thus obtaining these complex modulation symbols. For an OFDM system, the number of complex modulation symbols in the complex modulation symbols sequence $A_m$ is equal to the number of subcarriers used by the system, which is N in the example of FIG. 1A.

Figure 1B:
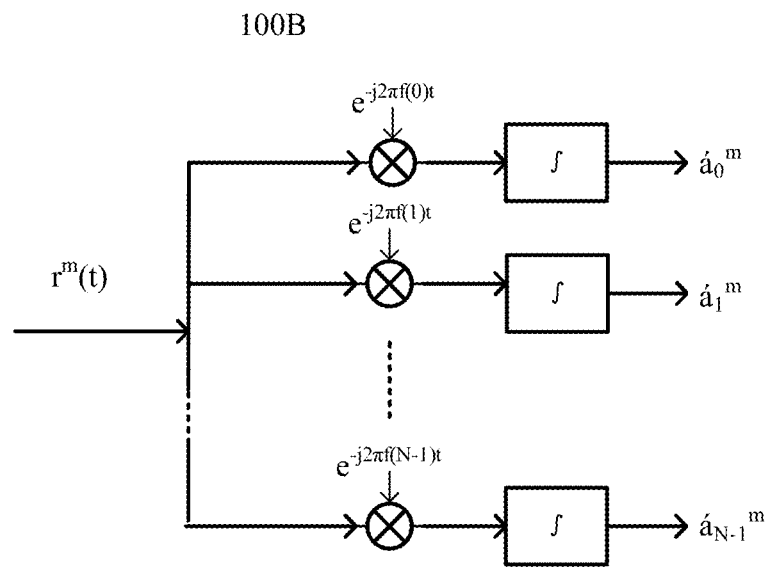
Figure 1C:
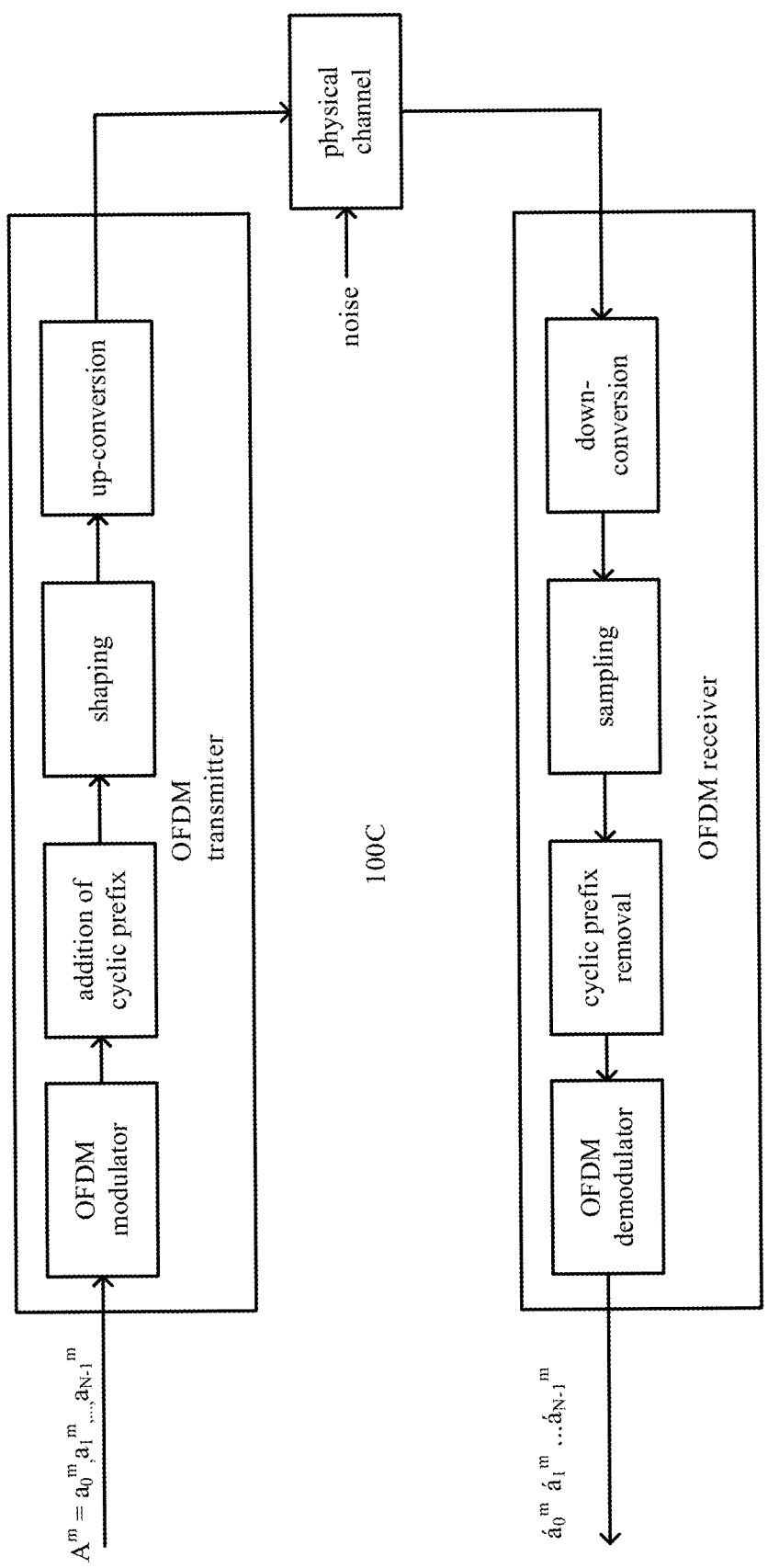
Figure 1D:
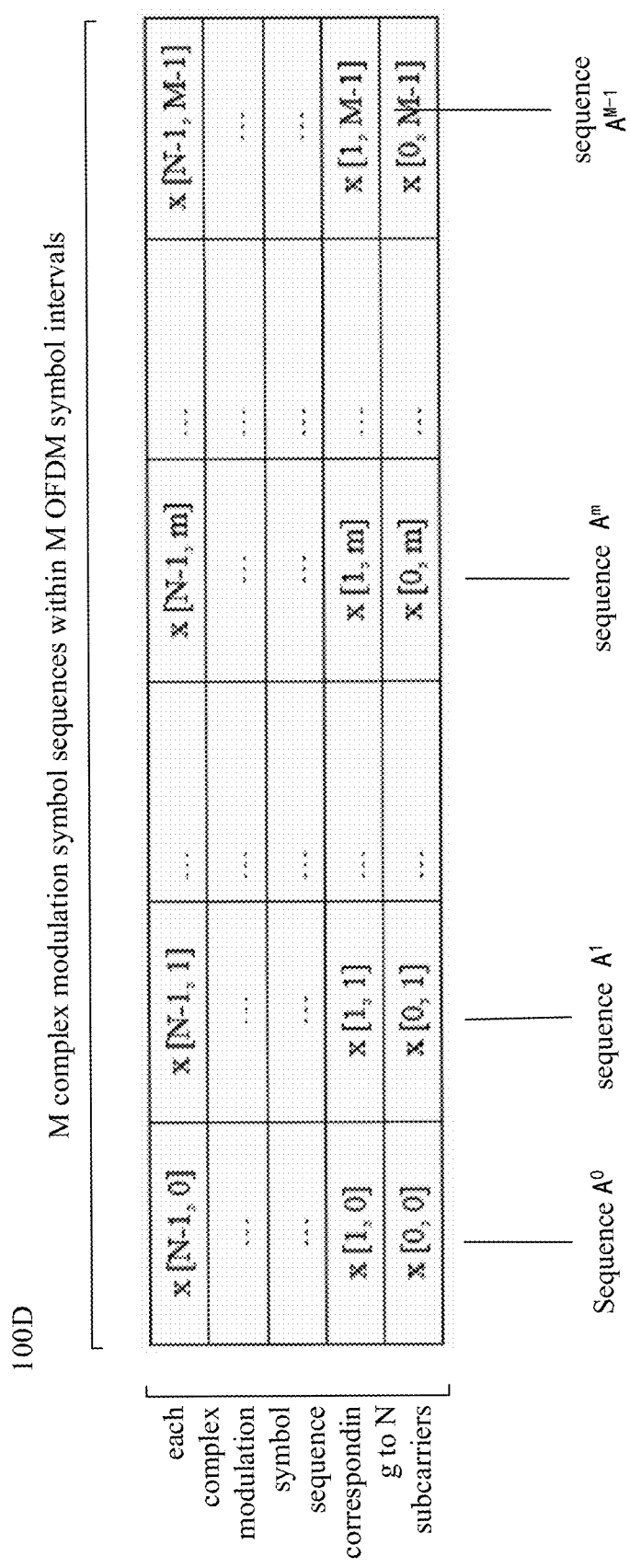

A plurality of complex modulation symbol sequences to be modulated and transmitted within multiple OFDM symbol intervals, respectively, may be represented as a complex modulation symbol block 100D to be transmitted in FIG. 1D. As an example, the complex modulation symbol block 100D in FIG. 1D is presented as one N×M two-dimensional block, where each row corresponds to one subcarrier and each column corresponds to one OFDM symbol interval, the two-dimensional block including M complex modulation symbol sequences $A^0, A^1, \ldots, A^m, \ldots, A^{M-1}$ to be modulated and transmitted in sequence within M OFDM symbol intervals, each complex modulation symbol sequence including N complex modulation symbols. For example, the complex modulation symbol sequence $A^m$ will be modulated and transmitted within the m-th OFDM symbol interval. The N complex modulation symbols in each complex modulation symbol sequence will be separately transmitted by N subcarriers of the OFDM system within the same OFDM symbol interval. The input complex modulation symbol sequence $A^m$ of the OFDM modulator 100A shown in FIG. 1A may correspond to the sequence $A^m$ in FIG. 1D. That is, complex modulation symbols $a_0^m, a_1^m, \ldots, a_{N-1}^m$ correspond to the complex modulation symbols x[0,m], x[1,m], ..., x[N−1,m] in FIG. 1D, respectively, and these complex modulation symbols will be modulated and transmitted by the OFDM modulator 100A within the m-th OFDM symbol interval as follows.

Now return to FIG. 1A for description. As shown in FIG. 1A, these complex modulation symbols in the complex modulation symbols sequence $A^m$ can be multiplied in parallel with corresponding subcarriers after undergoing a serial-to-parallel conversion. Each complex modulation symbol $a_k^m$ (k=0, 1, . . . , N−1) in the input complex modulation symbol sequence $A^m$ is multiplied with the corresponding subcarrier $e^{j2\pi f(k)t}$ respectively, thereby obtaining the corresponding modulated subcarrier signal $s_k^m(t)$. Wherein, $f(k)=k\Delta f$ represents the frequency of the subcarrier corresponding to the complex modulation symbol $a_k^m$, and $\Delta f$ represents the subcarrier interval in frequency between adjacent subcarriers.

Subsequently, the resulting N modulated subcarrier signals $s_k^m(t)$ can be superimposed to obtain the basic OFDM signal $s^m(t)$. $s^m(t)$ can be expressed as:

$$s^m(t)=\Sigma_{k=0}^{N-1}s_k^m(t)=\Sigma_{k=0}^{N-1}a_k^m e^{j2\pi k\Delta ft}$$

Similarly, for the subsequent complex modulation symbol sequence $A^{m+1}$ to be transmitted within the m+1th OFDM symbol interval, the OFDM modulator 100A can be used to obtain the basic OFDM signal $s^{m+1}(t)$. In this way, the OFDM system modulates each group of complex modulation symbols within different symbol intervals onto corresponding subcarriers, thereby achieving specific time-frequency resource allocation.

The number of OFDM subcarriers can be determined as needed. The number can range from less than 100 to several thousand. The subcarrier interval between subcarriers can be selected as needed, for example, in the range from several hundred kHz to several kHz. The subcarrier interval used may depend on various aspects of an environment in which the system operates, such as the maximum radio channel frequency selectivity expected in the environment and the expected maximum channel change rate (i.e., the maximum expected Doppler frequency offset). Once the subcarrier interval has been selected, the number of subcarriers can be decided based on the overall transmission bandwidth.

FIG. 1B shows the basic principle of OFDM demodulation, in which an OFDM demodulator 100B is shown. The OFDM demodulator 100B includes N correlators, each used for one subcarrier. The basic OFDM signal $s^m(t)$ output by the OFDM modulator of FIG. 1A is received by a device on a receiving side after transmission through a physical channel. Use $r^m(t)$ to represent the received signal within one symbol interval. Using each of the illustrated correlators, the $r^m(t)$ is correlated with the corresponding subcarrier, so as to obtain the recovered modulation symbols $á_0^m, á_1^m, \ldots, á_{N-1}^m$, respectively. Considering the orthogonality between the subcarriers, ideally, two OFDM subcarriers will not interfere with each other after demodulation.

FIG. 1C depicts a system block diagram of an OFDM system 100C. As shown in FIG. 1C, the OFDM system 100C includes at least an OFDM transmitter and an OFDM receiver. The sequence of complex modulation symbols to be transmitted is sent into the OFDM transmitter, which, after undergoing OFDM modulation performed by an OFDM modulator (e.g., 100A as described with respect to FIG. 1A), is further subjected to operations such as IFFT transformation, addition of cyclic prefix, shaping, and up-conversion, until being transmitted outward. The transmitted radio signal is transmitted to the OFDM receiver through a physical channel, which, after undergoing operations such as down-conversion, sampling, and removal of the cyclic prefix, is further demodulated via an OFDM demodulator (e.g., 100B as described with respect to FIG. 1B), so that the complex modulation symbols $á_0^m, á_1^m, \ldots, á_{N-1}^m$ are recovered.

However, the use of multiple orthogonal subcarriers allocated in advance to modulate complex modulation symbols makes the OFDM system very sensitive to the frequency offset. In high-speed mobile scenarios, the Doppler frequency offset of the fast time-varying physical channel will seriously affect the bit error performance of the OFDM system, thereby limiting its application in high-speed mobile scenarios.

OTFS system is a new modulation and multiple access technology. Unlike the OFDM system that performs modulation by taking a group of complex modulation symbols within a single modulation symbol interval as a unit, the OTFS system performs joint processing on multiple groups of complex modulation symbols within multiple modulation symbol intervals, so as to obtain diversity gains for countering the Doppler frequency offset. However, the shortcomings of the OTFS system are also very obvious. For example, the OTFS system requires multiple groups of complex modulation symbols across multiple modulation symbol intervals to be processed as a whole on both the transmitting side and the receiving side, so the processing complexity is high. On the receiving side, it is necessary to wait for all symbols of multiple modulation symbol intervals to be received before the overall processing, which causes endogenous system delay. Moreover, the complexity of the channel equalization of the OTFS system is much higher than that of the OFDM system, making it difficult to implement on an actual system, especially for handheld devices.

It can be seen from the above description that the OFDM system lacks an design to counter the Doppler frequency offset, while OTFS performs an overall processing on multiple groups of complex modulation symbols across multiple symbol intervals, although the ability to counter the Doppler frequency offset is obtained, at the same time, unacceptable system delays and huge equalization complexity on the receiving side are introduced.

To this end, the present disclosure provides an improved electronic device and communication method in high-speed mobile scenarios, which can effectively cope with the time-varying Doppler Effect in high-speed mobile scenarios, while having low implementation complexity and system delay. The following uses the OFDM system as an example for description.

Figure 2:
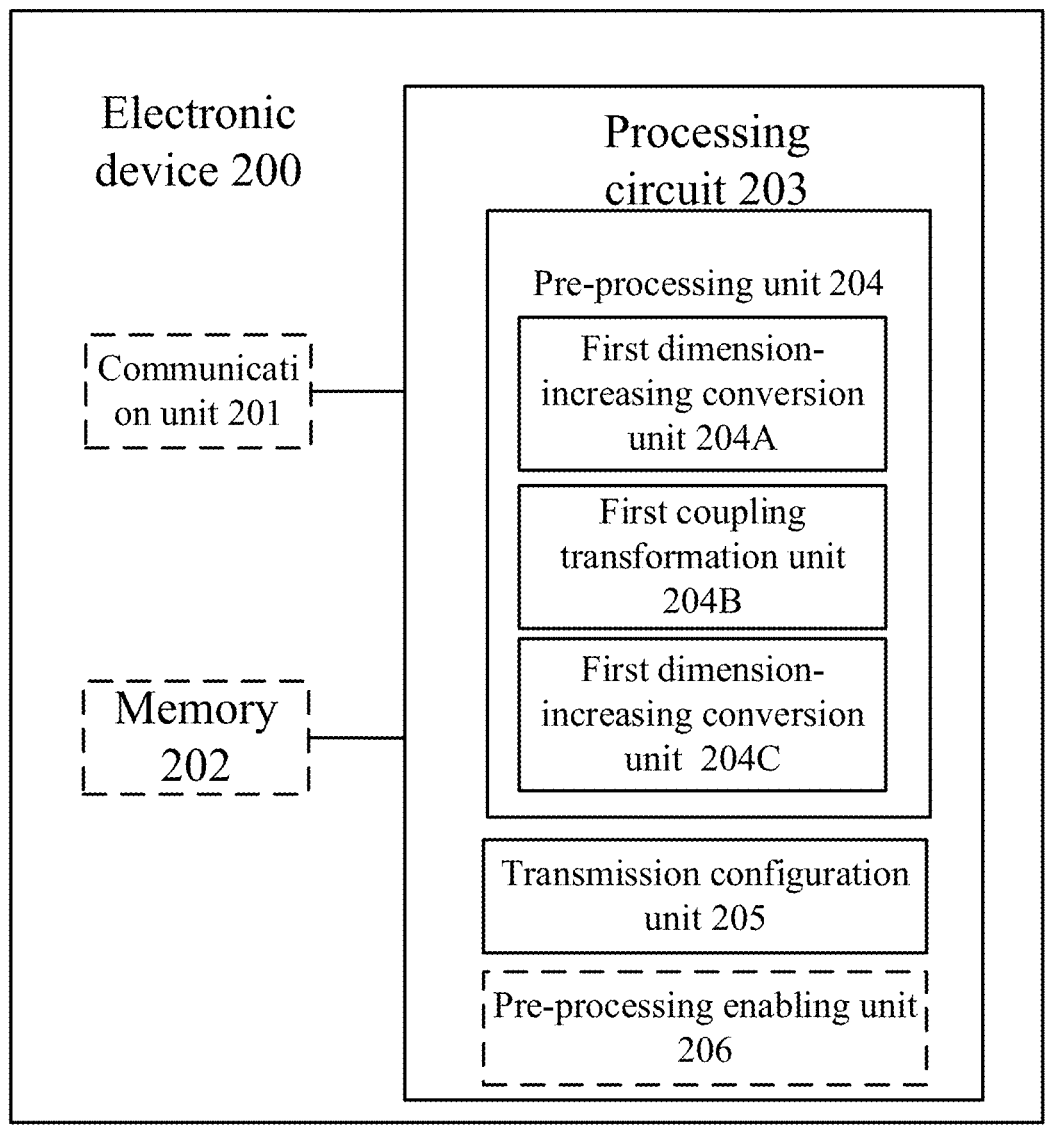
FIG. 2 shows a block diagram of an electronic device for a transmitting side according to an embodiment of the present disclosure.

2. Electronic Device for a Transmitting Side According to an Embodiment of the Present Disclosure FIG. 2 shows a block diagram of an electronic device 200 for a transmitting side according to an embodiment of the present disclosure. According to an embodiment of the present disclosure, the electronic device 200 may be located in various control devices or transmission devices. The control device mentioned here is, for example, a base station such as eNB or gNB of 3GPP's 5G communication standard, a remote radio head, a wireless access point, etc., and the transmission device includes, for example, a large-sized in-vehicle transmission device or a fixed transmission device (for example, an unmanned aerial vehicles management tower) and a transmitter in a satellite communication system. According to another embodiment of the present disclosure, the electronic device 200 may also be located in a communication device (such as a smartphone) for a user side.

The electronic device 200 for a transmitting side according to one embodiment of the present disclosure may include, for example, a communication unit 201, a memory 202, and a processing circuit 203.

The processing circuit 203 can provide various functions of the electronic device 200. According to one embodiment of the present disclosure, the processing circuit 203 can be configured to perform a pre-processing operation on the first one-dimensional sequence of modulation symbols, the pre-processing operation coupling each modulation symbol within the first one-dimensional sequence of modulation symbols to obtain part of diversity gains countering the Doppler frequency offset. The first one-dimensional sequence of modulation symbols is converted into a second one-dimensional sequence of modulation symbols through this pre-processing operation. The processing circuit 203 further configures the transmission of the second one-dimensional sequence of modulation symbols for transmission by the communication unit 201.

The processing circuit 203 may include various units for realizing the functions described above. According to one embodiment of the present disclosure, the processing circuit 203 may include a pre-processing unit 204 and a transmission configuration unit 205, and may optionally include a pre-processing enabling unit 206.

The pre-processing unit 204 can be used to perform a pre-processing operation on the first one-dimensional sequence of modulation symbols. In one embodiment, the first one-dimensional sequence of modulation symbols may be a group of complex modulation symbols to be transmitted obtained from additional modulation units (not shown), such as QPSK modulation unit, QAM modulation unit or other units for mapping the bit stream to be transmitted into modulation symbols. For example, the first one-dimensional sequence of modulation symbols may be a group of complex modulation symbols $A^m$ to be transmitted within one modulation symbol interval described in respect to FIG. 1A.

According to one embodiment of the present disclosure, the pre-processing operation on the first one-dimensional sequence of modulation symbols may include a first dimension-increasing conversion, a first coupling transformation, and a first dimension-decreasing conversion. These operations may be performed, respectively, by the first dimension-increasing conversion unit 204A, the first coupling transformation unit 204B, and the first dimension-decreasing conversion unit 204C included in the pre-processing unit 204.

The first dimension-increasing conversion unit 204A can be used to perform a first dimension-increasing conversion to convert the first one-dimensional sequence of modulation symbols into a first multi-dimensional modulation symbol block. The first multi-dimensional modulation symbol block may be a two-dimensional modulation symbol block, or have a higher dimension. The first dimension-increasing conversion can map each modulation symbol in the first one-dimensional sequence of modulation symbols to a corresponding position in the first multi-dimensional modulation symbol block one by one. The resulting first multi-dimensional modulation symbol block may be transferred to the first coupling transformation unit 204B. More details on the first dimension-increasing conversion will be described in Section 4.2 below.

The first coupling transformation unit 204B may transform the first multi-dimensional modulation symbol block into the second multi-dimensional modulation symbol block with a first transformation, wherein the first transformation couples each symbol in the first multi-dimensional modulation symbol block with each other. Modulation symbols in the second multi-dimensional modulation symbol block obtained by the first coupling transformation have coupling association with each other, so that diversity gains for countering the Doppler frequency offset can be obtained; therefore, it has improved transmission performance, such as a lower bit error rate, in a fast time-varying physical channel in high-speed mobile scenarios. The first coupling transformation unit 204B may transfer the second multi-dimensional modulation symbol block to the first dimension-decreasing conversion unit 204C. More details about the first coupling transformation will be described in Section 4.3 below.

The first dimension-decreasing conversion unit 204C can be used to perform a first dimension-decreasing conversion to convert the second multi-dimensional modulation symbol block into a second one-dimensional sequence of modulation symbols. The first dimension-decreasing conversion performed by the first dimension-decreasing conversion unit 204C may be an inverse process of the first dimension-increasing conversion performed by the first dimension-increasing conversion unit 204A. More details about the first dimension-decreasing conversion will be described in Section 4.4 below. Therefore, the second one-dimensional sequence of modulation symbols will have the same size as the first one-dimensional sequence of modulation symbols. This allows the second one-dimensional sequence of modulation symbols to be directly applied to a conventional system (such as an OFDM system or other multi-carrier systems) originally used to transmit the first one-dimensional sequence of modulation symbols. For example, when the first one-dimensional sequence of modulation symbols is a group of complex modulation symbols $A^m$ described with respect to FIG. 1A, the second one-dimensional sequence of modulation symbols obtained by pre-processing the $A^m$ can be directly applied to subsequent processes starting from the serial-to-parallel conversion for $A^m$ described in FIG. 1A.

The pre-processing unit 204 may transfer the second one-dimensional sequence of modulation symbols to the transmission configuration unit 205, and the transmission configuration unit 205 configures the transmission of the second one-dimensional sequence of modulation symbols so that it is suitable for transmission using a single carrier system or a multi-carrier system. The operations performed by the transmission configuration unit 205 may include, but are not limited to, inverse Fourier transform, addition of cyclic prefix (CP), carrier/subcarrier modulation, digital-to-analog conversion, and the like.

The transmission configuration unit 205 may transmit signals to be transmitted to the communication unit 201 of the electronic device 200. The communication unit 201 can be used to transmit radio signals to a relay device or an electronic device on a receiving side under the control of the processing circuit 203. In the embodiments of the present disclosure, the communication unit 201 can be implemented as a communication interface component such as an antenna device, a radio frequency circuit, and some baseband processing circuits, for example. The communication unit 201 is drawn with dotted lines because it can also be located inside the processing circuit 203 or outside the electronic device 200.

According to one embodiment of the present disclosure, the processing circuit 203 may also optionally include a pre-processing enabling unit 206. The pre-processing enabling unit 206 can be used to determine whether to enable the pre-processing unit 204 to perform a pre-processing operation on the first one-dimensional sequence of modulation symbols. When it is determined that the pre-processing operation would not be enabled, the first one-dimensional sequence of modulation symbols may be directly transmitted to the transmission configuration unit 205 without undergoing the pre-processing operation. The pre-processing enabling unit 206 is drawn with dotted lines because it can also be located outside the processing circuit 203 or outside the electronic device 200.

The memory 202 of the electronic device 200 may store information generated by the processing circuit 203 (such as the aforementioned various sequence of modulation symbols and multi-dimensional modulation symbol blocks), information received from other devices through the communication unit 201, programs, machine codes and data for operations of the electronic device 200, etc. The memory 202 is drawn with dotted lines because it can also be located inside the processing circuit 203 or outside the electronic device 200. The memory 202 may be a volatile memory and/or a non-volatile memory. For example, the memory 202 may include, but is not limited to, random access memory (RAM), dynamic random access memory (DRAM), static random access memory (SRAM), read only memory (ROM), and flash memory.

It should be noted that the various units described above are exemplary and/or preferred modules for implementing the processes described in this disclosure. These modules may be hardware units (such as a central processor, a field programmable gate array, a digital signal processor, or an application specific integrated circuit, etc.) and/or software modules (such as a computer-readable program). The modules for implementing the steps described below are not described in detail above. However, as long as there is a step to perform a certain process, there may be a corresponding module or unit (implemented by hardware and/or software) for performing the same process. The technical solutions defined by all combinations of the steps described below and the units corresponding to these steps are included in the disclosure of the present disclosure as long as these technical solutions constituted by them are complete and applicable.

In addition, a device composed of various units may be incorporated as a functional module into a hardware device such as a computer. In addition to these functional modules, the computer can of course have other hardware or software components.

3. Communication Method According to an Embodiment of the Present Disclosure

Figure 3:
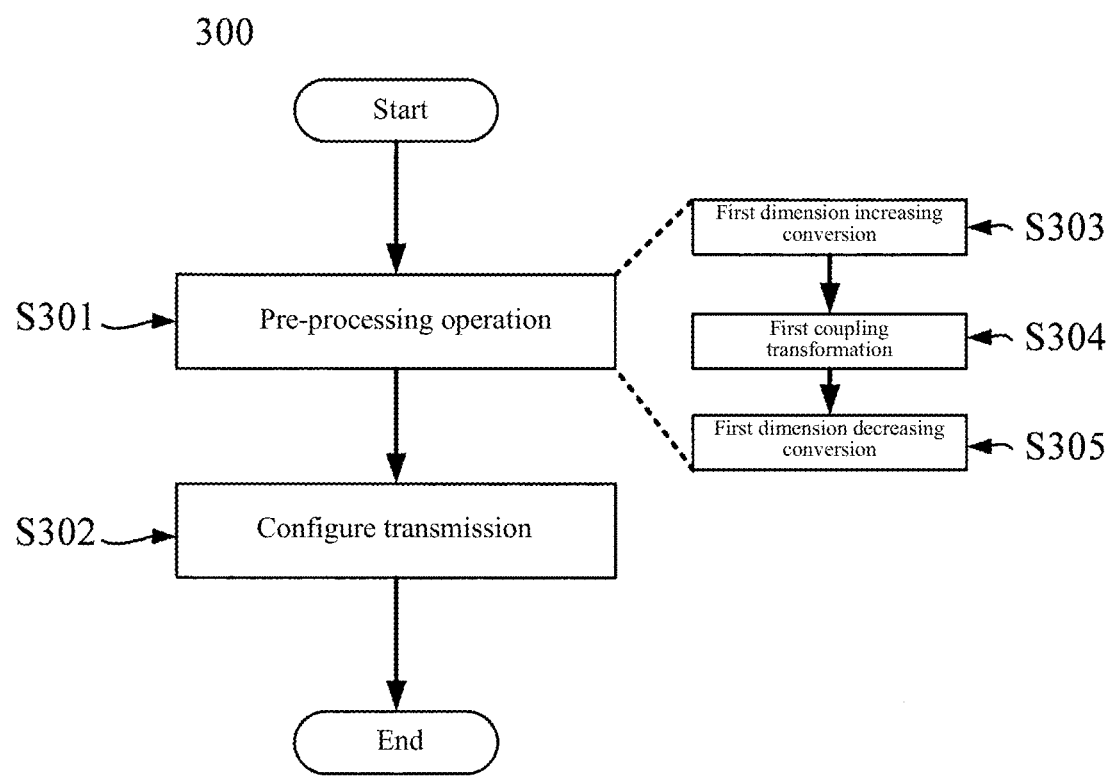
FIG. 3 shows a flowchart of a communication method for an electronic device for a transmitting side according to an embodiment of the present disclosure.

FIG. 3 shows a flowchart of a communication method 300 for an electronic device for a transmitting side according to an embodiment of the present disclosure. The communication method 300 can be used in the electronic device 200 as described in FIG. 2, for example.

As shown in FIG. 3, in step S301, a pre-processing operation is performed on the first one-dimensional sequence of modulation symbols to obtain a second one-dimensional sequence of modulation symbols. The first one-dimensional sequence of modulation symbols may be obtained from a unit such as a QPSK modulation unit, a QAM modulation unit, or other units for mapping the bit stream to be transmitted into modulation symbols. Step S301 can be performed by the processing circuit 203 of the electronic device 200, more specifically, by the pre-processing unit 204.

In FIG. 3, step S301 is further shown including sub-steps S303, S304, and S305. In sub-step S303, a first dimension-increasing conversion is performed to convert the first one-dimensional sequence of modulation symbols into a first multi-dimensional modulation symbol block. In sub-step S304, the first multi-dimensional modulation symbol block is transformed into a second multi-dimensional modulation symbol block by means of a first coupling transformation, wherein the first coupling transformation couples each symbol in the first multi-dimensional modulation symbol block with each other. In sub-step S305, a first dimension-decreasing conversion is performed to convert the second multi-dimensional modulation symbol block into a second one-dimensional sequence of modulation symbols, wherein the first dimension-decreasing conversion is an inverse process of the first dimension-increasing conversion in S303. Steps S303, S304, and S305 can be performed by the processing circuit 203 of the electronic device 200, more specifically, by the first dimension-increasing conversion unit 204A, the first coupling transformation unit 204B, and the first dimension-decreasing conversion unit 204C included in the pre-processing unit 204, respectively.

There are coupling association between symbols in the second one-dimensional sequence of modulation symbols obtained through step S301. Therefore, compared with the first one-dimensional sequence of modulation symbols without pre-processing, the second one-dimensional sequence of modulation symbols obtains diversity gains for countering the Doppler frequency offset, which makes it have an improved transmission performance in fast time-varying physical channels.

Next, in step S302, the transmission of the second one-dimensional sequence of modulation symbols is configured so that it is suitable for transmission using a single carrier system or a multi-carrier system. The configuration operation in step S302 may include any operation suitable for the selected system, such as one or more of inverse Fourier transform, addition of cyclic prefix (CP), carrier/subcarrier modulation, digital-to-analog conversion, etc. Step S302 can be performed by the processing circuit 203 of the electronic device 200, more specifically, by the transmission configuration unit 205.

After configuring the transmission of the second one-dimensional sequence of modulation symbols, a corresponding communication unit (for example, the communication unit 201 of the electronic device 200) can be used to transmit radio signals, thereby transmitting the second one-dimensional sequence of modulation symbols.

Additionally or optionally, the communication method 300 may further include the step of determining whether the pre-processing operation should be enabled. This step can be performed before step S301, for example. This step can be performed by the processing circuit 203 of the electronic device 200, and more specifically, by the pre-processing enabling unit 206. When it is determined that the pre-processing operation would not be enabled, the method 300 may skip step S301. In this case, the transmission of the first one-dimensional sequence of modulation symbols is directly configured in step S302.

4. Pre-Processing Operation According to an Embodiment of the Present Disclosure An embodiment of the pre-processing operation is described below. According to an embodiment of the present disclosure, the pre-processing operation may include a first dimension-increasing conversion, a first coupling transformation, and a first dimension-decreasing conversion. Each of these operations will be described below. It should be noted that the following description is provided for illustrative or explanatory purposes only, and is not intended to limit the scope of the present disclosure.

4.1 Input for the Pre-Processing Operation

The pre-processing operation may convert the input first one-dimensional sequence of modulation symbols into a second one-dimensional sequence of modulation symbols for transmission. According to one embodiment of the present disclosure, the first one-dimensional sequence of modulation symbols may include a plurality of complex modulation symbols, and the complex modulation symbols may be one of complex modulation symbols such as QPSK symbols and QAM symbols. Correspondingly, these complex modulation symbols can come from QPSK modulators, QAM modulators, etc., these modulators obtaining corresponding complex modulation symbols by mapping each bit in the bit stream to be transmitted onto a constellation diagram (also called constellation point mapping).

FIG. 4A shows a constellation diagram of QPSK modulation. The QPSK constellation shown in FIG. 4A has 4 constellation points that can be selected, that is, the modulation order is 4. Therefore, each QPSK symbol corresponds to $\log_2 4=2$ bits. As shown in the constellation diagram, each constellation point mapping takes two bits as a unit. The mapping relationship between QPSK symbol x and bit is as follows:

$$x = \begin{cases} 1+i, & \text{The input bit is } 11 \\ 1-i, & \text{The input bit is } 10 \\ -1-i, & \text{The input bit is } 00 \\ -1+i, & \text{The input bit is } 01 \end{cases}$$

For example, if the bit stream to be transmitted is 1110100100, a series of QPSK symbols will be obtained according to the QPSK modulation shown in FIG. 4A, in this order: $x_1=1+i$, $x_2=1-i$, $x_3=1-i$, $x_4=-1+i$, $x_5=-1-i$. It should be noted that, although the process of QPSK modulation is described with respect to FIG. 4A, other modulation methods (such as QAM) can also be used to map the bits in the bit stream to be transmitted to corresponding types of complex modulation symbols.

After obtaining a series of complex modulation symbols (such as QPSK symbols, QAM symbols), these complex modulation symbols can be arranged by columns in the form of a symbol sequence. Each column of modulation symbols of a multi-carrier system may include multiple modulation symbols to be transmitted by multiple carriers. The OFDM system is one example of a multi-carrier system. According to one embodiment of the present disclosure, in an OFDM system, each modulation symbol will be further modulated onto multiple orthogonal subcarriers in the frequency domain. Therefore, according to the number of subcarriers used in the OFDM system (assuming 32), each complex modulation symbol is naturally arranged sequentially in groups of 32 into a plurality of complex modulation symbol sequences x as shown below.

$$\begin{bmatrix} x_1 \\ x_2 \\ x_3 \\ \vdots \\ x_{32} \end{bmatrix}, \begin{bmatrix} x_{33} \\ x_{34} \\ x_{35} \\ \vdots \\ x_{64} \end{bmatrix}, \ldots$$

In an OFDM system, the plurality of complex modulation symbol sequences are subjected to inverse discrete Fourier transform (IDFT) and subsequent operations on a column-by-column basis. Then, the OFDM system transmits all 32 complex modulation symbols in one complex modulation symbol sequence within one symbol interval (also referred to as OFDM symbol interval), and transmits all 32 complex modulation symbols in another complex modulation symbol sequence within the next symbol interval.

According to one embodiment of the present disclosure, the pre-processing operation can be performed before the above IDFT inverse transform in the OFDM system. The input to the pre-processing operation (i.e., the first one-dimensional sequence of modulation symbols) may include a complex modulation symbol sequence to be transmitted on multiple subcarriers within one or more symbol intervals. For example, the number of complex modulation symbols included in the first one-dimensional sequence of modulation symbols can be determined according to processing capabilities.

Since the complexity of the pre-processing operation (and the processing complexity on the receiving side as to be described later) increases significantly as the number of complex modulation symbols contained in the first one-dimensional sequence of modulation symbols increases, and processing of complex modulation symbols across multiple symbol intervals may introduce system delay, therefore, according to a preferred embodiment of the present disclosure, the first one-dimensional sequence of modulation symbols may include complex modulation symbols to be transmitted on multiple subcarriers within one symbol interval. For example, for an OFDM system, the first one-dimensional sequence of modulation symbols may correspond to a group of complex modulation symbols scheduled to be transmitted on multiple subcarriers within one OFDM symbol interval. More specifically, if the number of subcarriers used by the OFDM system is N, the first one-dimensional sequence of modulation symbols includes N complex modulation symbols that are scheduled to be transmitted by using the multiple subcarriers within one OFDM symbol interval. OFDM modulation is performed on the second one-dimensional sequence of modulation symbols obtained from the first one-dimensional sequence of modulation symbols through a pre-processing operation, so as to complete radio transmission of the group of complex modulation symbols within one OFDM symbol interval. This can advantageously reduce the processing complexity on the transmitting side and the receiving side, making the system more suitable for implementation on a handheld device such as a smartphone. In addition, on the receiving side, there is no need to wait for the reception of all complex modulation symbols in multiple symbol intervals for performing the overall processing, thereby avoiding the introduction of endogenous system delay.

Although the above has been described with respect to a multi-carrier system, these descriptions can also be applied to a single carrier system, such as an SC-FDMA system. Unlike a multi-carrier system, a single carrier system does not require modulation symbols (such as QPSK symbols and QAM symbols) to be in columns. This is because symbols of a single carrier system are modulated onto the time domain, so it does not require IDFT transformation on the transmitting side. In a single carrier system, after the modulation symbol stream is obtained through bit stream mapping, these modulation symbols are directly transmitted in sequence.

However, many existing single carrier systems use cyclic prefix (CP). Since the addition of cyclic prefixes requires modulation symbols to be in columns (because only in this way, a part of symbols at the end of the column can be copied to the beginning of the column to form a cyclic prefix), these single carrier systems actually also involve grouping the modulation symbol stream into a plurality of modulation symbol sequences. Such modulation symbol sequences of a single carrier system can be used as an input to a pre-processing operation, that is, as the first one-dimensional sequence of modulation symbols. As explained earlier, symbols of a single carrier system are modulated onto the time domain. Therefore, unlike that the first one-dimensional sequence of modulation symbols in a multi-carrier system may include frequency-domain modulation symbols, the first one-dimensional sequence of modulation symbols in a single carrier system may include time-domain modulation symbols.

In addition, for a single carrier system that does not use a cyclic prefix, the modulation symbol stream can also be divided into a plurality of modulation symbol sequences as in a multi-carrier system, and one or more of the modulation symbol sequences can be selected as the input to the pre-processing operation (i.e., the first one-dimensional sequence of modulation symbols). After inputting the first one-dimensional sequence of modulation symbols, the first dimension-increasing conversion can be performed.

4.2 First Dimension-Increasing Conversion

According to an embodiment of the present disclosure, the first dimension-increasing conversion can be used to convert a first one-dimensional sequence of modulation symbols into a first multi-dimensional modulation symbol block. The first multi-dimensional modulation symbol block may be a two-dimensional modulation symbol block, or may have a higher dimension.

For ease of description, the following uses two-dimensional as an example to describe the first dimension-increasing conversion for the conversion of the first one-dimensional sequence of modulation symbols into the first multi-dimensional modulation symbol block. On this basis, those skilled in the art can conceive of applying the principle to the conversion of a one-dimensional sequence of modulation symbols into a higher-dimensional modulation symbol block.

According to one embodiment of the present disclosure, in order to convert the N×1 first one-dimensional sequence of modulation symbols x into the first two-dimensional modulation symbol block X, the size of the first two-dimensional modulation symbol block X can be determined first. The first two-dimensional modulation symbol block X can be a K×L two-dimensional block, where K, L may be any positive integer greater than 1, and may satisfy K×L=N. The values of K and L can be appropriately determined according to the processing capabilities of the electronic device, for example.

After determining the size of the first two-dimensional modulation symbol block X, each modulation symbol in the first one-dimensional sequence of modulation symbols x can be mapped to a corresponding position in the first two-dimensional modulation symbol block X one by one. According to one embodiment of the present disclosure, the mapping process can be implemented by the following two steps, as shown in FIG. 4B.

Step S401: Reorder each modulation symbol in the first one-dimensional sequence of modulation symbols x to obtain an intermediate sequence x', as shown below.

$$x = \begin{bmatrix} x_0 \\ x_1 \\ x_2 \\ \vdots \\ x_{N-2} \\ x_{N-1} \end{bmatrix} \xrightarrow[p[i]]{\text{Reorder}} x' = \begin{bmatrix} x_{p[0]} \\ x_{p[1]} \\ x_{p[2]} \\ \vdots \\ x_{p[N-2]} \\ x_{p[N-1]} \end{bmatrix}$$

Wherein, the column vector x represents the first one-dimensional sequence of modulation symbols; the column vector x' represents the one-dimensional intermediate sequence after reordering; p[i] is the reordering mapping about the original sequence number i, and its value is one of a series of different non-negative integers and satisfy $p[i] \in \{0, 1, 2, \ldots, N-1\}$.

It should be noted that as long as it is satisfied that the values of p[i] are in the set $\{0, 1, 2, \ldots, N-1\}$ and are different from each other, the design of the reordering mapping p[i] can be arbitrary. This is equivalent to an ordered arrangement for N distinguishable modulation symbols, so p[i] can have N! (the factorial of N) different design solutions.

In one example, p[i] can be taken as p[i]=(i+1) mod N. That is, for each original sequence number i, taking the remainder of i+1 with respect to N as the new sequence number, the reordering can be expressed as:

$$x = \begin{bmatrix} x_0 \\ x_1 \\ x_2 \\ \vdots \\ x_{N-2} \\ x_{N-1} \end{bmatrix} \xrightarrow[p[i]]{\text{Reorder}} x' = \begin{bmatrix} x_1 \\ x_2 \\ x_3 \\ \vdots \\ x_{N-1} \\ x_0 \end{bmatrix}$$

That is, each element in the column vector x is cyclically shifted forward once.

In yet another example, a unit transformation (p[i]=i) can be adopted, that is, no reordering is performed.

The reordering mapping p[i] has different values within the given set of non-negative integers, which also ensures that the mapping p[i] is invertible. That is, there is one corresponding inverse mapping $p^{-1}[j]$, such that:

"p[i]=j" ⇔ "$p^{-1}[j]=p^{-1}[p[i]]=i$"

This makes it possible to perform the inverse process of mapping p[i] in the first dimension-decreasing conversion to be described later.

Step S402: Each modulation symbol in the reordered intermediate sequence x' is populated in the K×L first two-dimensional modulation symbol block X in a populating order agreed in advance.

As shown below, a table composed of K rows and L columns is used to represent the first two-dimensional modulation symbol block X, where the non-negative integer in each box represents the serial number of the modulation symbol populated. For example, if the integer in a box is i, then fill the element $x'_i = x_{p[i]}$ of the intermediate sequence x' at the corresponding position of the first two-dimensional modulation symbol block.

| 0 | K | ... | (L − 1)K |
| 1 | K + 1 | ... | (L − 1)K + 1 |
| 2 | K + 2 | ... | (L − 1)K + 2 |
| ... | ... | ... | ... |
| K − 1 | 2K − 1 | ... | LK − 1 |

Through the two-step mapping process described above, each modulation symbol in the first one-dimensional sequence of modulation symbols x can be mapped to a corresponding position in the first two-dimensional modulation symbol block X one by one, so that a first dimension-increasing conversion can be performed to convert the first one-dimensional sequence of modulation symbols x into a first two-dimensional modulation symbol block X. It should be noted that, although the first dimension-increasing conversion process is described here as having two steps, such two steps can be subdivided into more sub-steps or combined into one step.

For example, as a simplification of the above two-step mapping process, the first one-dimensional sequence of modulation symbols x can be sequentially populated, on a column-by-column basis, into each respective column of the first two-dimensional modulation symbol block X, or the first one-dimensional sequence of modulation symbols x can be sequentially populated, on a row-by-row basis, into each respective row in the first two-dimensional modulation symbol block X.

The first dimension-increasing conversion process can be performed by the first dimension-increasing conversion unit 204A in the electronic device 200 in step S303 of the method 300, for example. After the first dimension-increasing conversion, a first coupling transformation can be performed on the first multi-dimensional modulation symbol block.

4.3 First Coupling Transformation

According to an embodiment of the present disclosure, the first coupling transformation can be used to convert the first multi-dimensional modulation symbol block to the second multi-dimensional modulation symbol block. The first multi-dimensional modulation symbol block and the second multi-dimensional modulation symbol block may have the same dimension. The first multi-dimensional modulation symbol block and the second multi-dimensional modulation symbol block may be two-dimensional modulation symbol blocks, or may have higher dimensions.

For ease of description, the first coupling transformation is described below for the transformation of the first two-dimensional modulation symbol block to the second two-dimensional modulation symbol block. On this basis, those skilled in the art can understand that, the principle can be applied to the transformation between the first and second multi-dimensional modulation symbol blocks with higher dimensions.

According to one embodiment of the present disclosure, the first multi-dimensional modulation symbol block is a first two-dimensional modulation symbol block, and the first coupling transformation can be used to couple the symbols of the first two-dimensional modulation symbol block, thereby obtaining a second two-dimensional modulation symbol block in which symbols are coupled to each other. By coupling the modulation symbols to each other, it is possible to obtain gains for countering the Doppler frequency offset in fast time-varying physical channels, and improve transmission performance in high-speed mobile scenarios. Preferably, the first coupling transformation may be an invertible transform, which enables the received symbol to be correctly demodulated on the receiving side.

Without loss of generality, the first coupling transformation can be expressed mathematically as an invertible mapping $f(\cdot)$:

$$f(X)=Y$$

Where X is the first two-dimensional modulation symbol block to be transformed and Y is the second two-dimensional modulation symbol block obtained through transformation. In order to ensure that the mapping $f(\cdot)$ can couple each modulation symbol in X, it is required that for any element $y_{k,l}$ in Y, there are two elements $x_{i,j}, x_{m,n}$ in X, so that the corresponding second-order mixed partial derivative is not 0, that is, the following expression is satisfied:

$$\forall y_{k,l}, \exists x_{i,j}, x_{m,n} \text{ s.t. } \frac{\partial^2 y_{k,l}}{\partial x_{i,j} \partial x_{m,n}} \neq 0$$

Any mapping $f(\cdot)$ satisfying the above expression can be used to transform the first two-dimensional modulation symbol block into the second two-dimensional modulation symbol block.

According to a further embodiment of the present disclosure, the first coupling transformation used may be a linear transformation. Using linear transformation can reduce the complexity of system implementation.

According to a more specific embodiment of the present disclosure, the first coupling transformation used may further be an orthogonal transformation. Orthogonal transformation is a specific embodiment of linear transformation, which can ensure that the power before and after the transformation is constant, therefore, using orthogonal transformation can obtain gains on power processing.

According to a more specific embodiment of the present disclosure, the first coupling transformation may be any one of a multi-dimensional Discrete Symplectic Fourier Transform (DSFT), a multi-dimensional Discrete Cosine Transform (DCT) or a corresponding multi-dimensional Inverse Discrete Cosine Transform (IDCT), or a multi-dimensional Discrete Wavelet Transform (DWT) or a corresponding multi-dimensional Inverse Discrete Wavelet Transform (IDWT).

According to one embodiment of the present disclosure, the first coupling transformation can be a multi-dimensional DSFT transformation. When the first multi-dimensional modulation symbol block is a two-dimensional modulation symbol block, the first coupling transformation may be a two-dimensional DSFT transformation.

As shown in FIG. 4C, according to one embodiment of the present disclosure, the two-dimensional DSFT transformation on the first two-dimensional modulation symbol block may include the following two-step one-dimensional Fourier transform/inverse transform: (1) In step S403, apply a one-dimensional Fourier transform to each row of the first two-dimensional modulation symbol block to obtain an intermediate two-dimensional modulation symbol block; (2) In step S404, apply a one-dimensional inverse Fourier transform to each column of the intermediate two-dimensional modulation symbol block to obtain the second two-dimensional modulation symbol block.

In addition, similar to the embodiment of FIG. 4C, according to another embodiment of the present disclosure, the two-dimensional DSFT transformation on the first two-dimensional modulation symbol block may include the following two-step one-dimensional Fourier transform/inverse transform: (1) apply a one-dimensional inverse Fourier transform to each column of the first two-dimensional modulation symbol block to obtain an intermediate two-dimensional modulation symbol block; (2) apply a one-dimensional Fourier transform to each row of the intermediate two-dimensional modulation symbol block to obtain the second two-dimensional modulation symbol block.

The first coupling transformation process can be performed by the first coupling transformation unit 204B in the electronic device 200 in step S304 of the method 300, for example. After the first coupling transformation, a first dimension-decreasing conversion can be performed on the second multi-dimensional modulation symbol block.

4.4 First Dimension-Decreasing Conversion

According to an embodiment of the present disclosure, the first dimension-decreasing conversion can be used to convert a second multi-dimensional modulation symbol block obtained through the first coupling transformation into a second one-dimensional sequence of modulation symbols. The first dimension-decreasing conversion is an inverse process of the aforementioned first dimension-increasing conversion. The second multi-dimensional modulation symbol block may be a two-dimensional modulation symbol block or have a higher dimension, depending on the first dimension-increasing conversion used previously.

For ease of description, the first dimension-decreasing conversion process is described below for the conversion of the second two-dimensional modulation symbol block into the second one-dimensional sequence of modulation symbols. On this basis, those skilled in the art can conceive of applying the principle to the conversion of a higher-dimensional modulation symbol block into a one-dimensional sequence of modulation symbols.

Corresponding to the first dimension-increasing conversion process described in Section 4.2 above, the first dimension-decreasing conversion process can be implemented by the following two steps, as shown in FIG. 4D.

Step S405: Recover the second two-dimensional modulation symbol block with a size of K×L to the N×1 intermediate sequence in the reverse order of the populating order in the first dimension-increasing conversion.

For example, if step S402 of the first dimension-increasing conversion uses the populating order as shown in the following table to obtain the first two-dimensional symbol block X (i.e., populating on a column-by-column basis), then step S405 of the first dimension-decreasing conversion directly stitches respective column of the second two-dimensional modulation symbol block Y in sequence to obtain the recovered intermediate sequence y'. Wherein the second two-dimensional modulation symbol block Y is obtained by performing the first coupling transformation on the first two-dimensional modulation symbol block X.

| 0 | K | ... | (L − 1)K |
|---|---|---|---|
| 1 | K + 1 | ... | (L − 1)K + 1 |
| 2 | K + 2 | ... | (L − 1)K + 2 |
| ... | ... | ... | ... |
| K − 1 | 2K − 1 | ... | LK − 1 |

Step S406: Perform restorative reordering on elements in the recovered intermediate sequence As mentioned before, since the reordering mapping p[i] used in the first dimension-increasing conversion has a corresponding inverse map $p^{-1}[j]$, the second one-dimensional sequence of modulation symbols y can be obtained by applying the inverse map $p^{-1}[j]$ to the intermediate sequence y', as shown below.

$$y' = \begin{bmatrix} y_{p[0]} \\ y_{p[1]} \\ y_{p[2]} \\ \vdots \\ y_{p[N-2]} \\ y_{p[N-1]} \end{bmatrix} \xrightarrow[p_{-1}[j]]{\text{Reorder}} y = \begin{bmatrix} y_{p^{-1}[p[0]]} \\ y_{p^{-1}[p[1]]} \\ y_{p^{-1}[p[2]]} \\ \vdots \\ y_{p^{-1}[p[N-2]]} \\ y_{p^{-1}[p[N-1]]} \end{bmatrix} = \begin{bmatrix} y_0 \\ y_1 \\ y_2 \\ \vdots \\ y_{N-2} \\ y_{N-1} \end{bmatrix}$$

It should be noted that since the reordering mapping p[i] used in the first dimension-increasing conversion can have N! different designs, so the restorative reordering mapping $p^{-1}[j]$ used in the first dimension-decreasing conversion also has N! different designs accordingly.

Through the two-step process described above, each modulation symbol in the second two-dimensional modulation symbol block can be mapped back to a corresponding position in the second one-dimensional sequence of modulation symbols one by one, thereby performing the first dimension-decreasing conversion to convert the second two-dimensional modulation symbol block into a second one-dimensional sequence of modulation symbols. It should be noted that, although the first dimension-decreasing conversion process is described here as a two-step process, such two steps can be subdivided into more sub-steps or combined into one step.

For example, as a simplification of the above two-step process, the second two-dimensional modulation symbol block may be sequentially stitched into the second one-dimensional sequence of modulation symbols on a column-by-column basis, or the second two-dimensional modulation symbol block may be sequentially stitched into the second one-dimensional sequence of modulation symbols on a row-by-row basis.

The first dimension-decreasing conversion process can be performed by the first dimension-decreasing conversion unit 204C in the electronic device 200 in step S305 of the method 300, for example.

FIGS. 4E to 4G further illustrate schematic diagrams of specific examples of the first dimension-increasing conversion, the first coupling transformation, and the first dimension-increasing conversion. In FIG. 4E, the first one-dimensional sequence of modulation symbols 407 is converted into the first two-dimensional modulation symbol block 408 by the first dimension-increasing conversion. Wherein, the first one-dimensional sequence of modulation symbols 407 may include N complex modulation symbols to be transmitted within one OFDM symbol interval. For example, the first one-dimensional sequence of modulation symbols 407 is the complex modulation symbol sequence $A^m$ mentioned in Section 1. The first two-dimensional modulation symbol block 408 is a K×L symbol block, where L=N/K. Subsequently, as shown in FIG. 4F, the first two-dimensional modulation symbol block 408 undergoes the first coupling transformation to become a second two-dimensional modulation symbol block 409, where the first coupling transformation may be a DSFT transformation with K×L points. The resulting second two-dimensional modulation symbol block 409 is also a symbol block of size K×L. Next, as shown in FIG. 4G, the second two-dimensional modulation symbol block 409 undergoes the first dimension-decreasing conversion to become a second one-dimensional sequence of modulation symbols 410. Similar to the first one-dimensional sequence of modulation symbols 407, the second one-dimensional sequence of modulation symbols 410 also includes N complex modulation symbols. Optionally, for an OFDM system, the second one-dimensional sequence of modulation symbols 410 may be further IDFT transformed into a sequence 411, as shown in FIG. 4G.

After the above-described exemplary first dimension-increasing conversion, first coupling transformation and first dimension-decreasing conversion, the first one-dimensional sequence of modulation symbols is converted into a second one-dimensional sequence of modulation symbols. The second one-dimensional sequence of modulation symbols may be transmitted using a single carrier system or a multi-carrier system. Unlike the first one-dimensional sequence of modulation symbols where each modulation symbol is independent from each other, there exists coupling association between modulation symbols in the second one-dimensional sequence of modulation symbols, which makes the second one-dimensional sequence of modulation symbols to have diversity gains for counting the Doppler effect in fast time-varying physical channels compared to the first one-dimensional sequence of modulation symbols, so that its transmission has improved performance, for example, a lower bit error rate, in high-speed mobile scenarios.

In addition, since the first dimension-decreasing conversion used is an inverse process of the first dimension-increasing conversion, the second one-dimensional sequence of modulation symbols has the same size as that of the first one-dimensional sequence of modulation symbols. Therefore, the existing system for configuring and transmitting the first one-dimensional sequence of modulation symbols can be directly applied to the second one-dimensional sequence of modulation symbols. That is to say, the system including the pre-processing operation of the present disclosure can be implemented by adding a pre-processing module to an existing system. The pre-processing module may be, for example, the pre-processing unit 204 in the processing circuit 203 described with respect to FIG. 2. Since no more adjustments are required to the existing system, the embodiments of the present disclosure also have acceptable additional complexity and cost.

As it can be seen, by introducing a pre-processing operation including a first dimension-increasing conversion, a first coupling transformation, and a first dimension-decreasing conversion, the electronic device and the communication method according to the embodiments of the present disclosure can effectively cope with the time-varying Doppler effect in high-speed mobile scenarios, while having the complexity and system delay that are suitable for implementation in an actual system.

5. Electronic Device for a Receiving Side According to an Embodiment of the Present Disclosure FIG. 5 shows a block diagram of an electronic device 500 for the receiving side according to an embodiment of the present disclosure. According to one embodiment of the present disclosure, the electronic device 500 may be located in a communication device for the user side, such as a smartphone. According to another embodiment of the present disclosure, the electronic device 500 may be located in various control devices or transmitting devices. The control device mentioned here is, for example, a base station such as eNB or gNB of 3GPP's 5G communication standard, a remote radio head, a wireless access point, etc. The transmission device includes, for example, a large-sized in-vehicle transmission device or a fixed transmission device (for example, an unmanned aerial vehicles management tower) and a transmitter in a satellite communication system.

The electronic device 500 for the receiving side according to one embodiment of the present disclosure may include, for example, a communication unit 501, a memory 502, and a processing circuit 503.

The communication unit 501 can be used to receive or acquire radio signals transmitted by the electronic device 200 on the transmitting side. The radio signals may include one or more modulation symbol sequence(s) transmitted through a single carrier system or a multi-carrier system, such as the aforementioned second one-dimensional sequence of modulation symbols. The communication unit 501 may perform functions, such as down conversion, analog-to-digital conversion etc., on the received radio signal. For example, the communication unit 501 may also perform a part of the demodulation function of the multi-carrier system or the single carrier system, thereby providing the second one-dimensional sequence of modulation symbols to the processing circuit 503. In an embodiment of the present disclosure, the communication unit 501 can be implemented as a communication interface component such as an antenna device, a radio frequency circuit, and some baseband processing circuits, for example. The communication unit 501 is drawn with dotted lines because it can also be located inside the processing circuit 503 or outside the electronic device 500.

The memory 502 of the electronic device 500 may store information generated by the processing circuit 503, information received from other devices through the communication unit 501, programs, machine codes, and data used for operations of the electronic device 500. The memory 502 is drawn with dotted lines because it can also be located inside the processing circuit 503 or outside the electronic device 500. The memory 502 may be a volatile memory and/or a non-volatile memory. For example, the memory 502 may include, but is not limited to, random access memory (RAM), dynamic random access memory (DRAM), static random access memory (SRAM), read only memory (ROM), and flash memory.

The processing circuit 503 can provide various functions of the electronic device 500. According to one embodiment of the present disclosure, the processing circuit 503 can be configured to demodulate the second one-dimensional sequence of modulation symbols to obtain the original sequence of modulation symbols (e.g., the first one-dimensional sequence of modulation symbols) transmitted by the electronic device 200 on the transmitting side. The demodulation process performed by the processing circuit 503 may include a post-processing operation. Similar to the pre-processing operation performed on the transmitting side, the post-processing operation on the receiving side can couple modulation symbols within the second one-dimensional sequence of modulation symbols with each other to better obtain part of processing gains countering the Doppler frequency offset. The second one-dimensional sequence of modulation symbols can be converted into a third one-dimensional sequence of modulation symbols through a post-processing operation on the receiving side. The processing circuit 503 can also perform further processing on the third one-dimensional sequence of modulation symbols, such as channel equalization operation and subsequent demodulation operation (such as QPSK demodulation and QAM demodulation), thereby recovering the bit stream transmitted by the device on the transmitting side.

The processing circuit 503 may include various units for realizing the functions described above. According to one embodiment of the present disclosure, the processing circuit 503 may include a post-processing unit 504 and an equalization unit 505, and may optionally include a post-processing enabling unit 506.

The post-processing unit 504 can be used to perform a post-processing operation on the second one-dimensional sequence of modulation symbols. In one embodiment, the second one-dimensional sequence of modulation symbols may be a group of complex modulation symbols provided by the communication unit 501. The second one-dimensional sequence of modulation symbols can physically correspond to the second one-dimensional sequence of modulation symbols on the transmitting side.

According to one embodiment of the present disclosure, the post-processing operation on the second one-dimensional sequence of modulation symbols may include a second dimension-increasing conversion, a second coupling transform, and a second dimension-decreasing conversion. These operations can be performed by the second dimension-increasing conversion unit 504A, the second coupling transformation unit 504B, and the second dimension-decreasing conversion unit 504C included in the post-processing unit 504, respectively.

The second dimension-increasing conversion unit 504A can be used to perform a second dimension-increasing conversion on the second one-dimensional sequence of modulation symbols, thereby obtaining a third multi-dimensional modulation symbol block. The third multi-dimensional modulation symbol block may be a two-dimensional modulation symbol block, or have a higher dimension. The second dimension-increasing conversion can map each modulation symbol in the second one-dimensional sequence of modulation symbols to a corresponding position in the third multi-dimensional modulation symbol block one by one. The resulting third multi-dimensional modulation symbol block may be transferred to the second coupling transformation unit 504B.

The second coupling transformation unit 504B may transform the third multi-dimensional modulation symbol block into a fourth multi-dimensional modulation symbol block with a second transformation, wherein the second transformation couples symbols in the third multi-dimensional modulation symbol block with each other. Preferably, performing the second coupling transformation in the electronic device 500 on the receiving side corresponding to the first coupling transformation on the transmitting side can better counter the Doppler frequency offset. More details will be described in Section 8 below. The second coupling transformation unit 504B may transfer the fourth multi-dimensional modulation symbol block to the second dimension-decreasing conversion unit 504C.

The second dimension-decreasing conversion unit 504C can be used to perform a second dimension-decreasing conversion on the fourth multi-dimensional modulation symbol block, thereby obtaining a third one-dimensional sequence of modulation symbols. The second dimension-decreasing conversion performed by the second dimension-decreasing conversion unit 504C may be an inverse process of the second dimension-increasing conversion performed by the second dimension-increasing conversion unit 504A. Therefore, the third one-dimensional sequence of modulation symbols may have the same size as that of the second one-dimensional sequence of modulation symbols.

Additionally or optionally, the post-processing unit 504 may transmit the third one-dimensional sequence of modulation symbols to the equalization unit 505 to perform channel equalization operation, thereby directly recovering the original sequence of modulation symbols, for example, the first one-dimensional sequence of symbols described above, under certain SNR conditions. The channel equalization operation performed by the equalization unit 505 is performed for an equivalent channel. The equivalent channel may describe the transmission relationship between a complex modulation symbol sequence on the transmitting side (for example, the first one-dimensional sequence of modulation symbols) and the third one-dimensional sequence of modulation symbols on the receiving side. When performing the channel equalization operation, the equivalent channel formed by at least the pre-processing operation on the transmitting side, the actual physical channel, and the post-processing operation on the receiving side may be considered. More details about channel equalization are described in Section 8 below.

According to one embodiment of the present disclosure, the processing circuit 503 may further include a post-processing enabling unit 506. The post-processing enabling unit 506 is drawn with dotted lines because it can also be located outside the processing circuit 503 or outside the electronic device 500. The post-processing enabling unit 506 can be used to determine whether to enable the post-processing unit 504 to perform a post-processing operation on the second one-dimensional sequence of modulation symbols. When it is determined that the post-processing operation would not be enabled, this generally corresponds to the case that there is no pre-processing operation performed on the transmitting end, and the second one-dimensional sequence of modulation symbols can be directly transmitted to the equalization unit 505 without undergoing the post-processing operation. In this case, the equalization unit 505 may perform the channel equalization operation for the equivalent channel that does not include the pre-processing operation and the post-processing operation.

It should be noted that the various units described above are exemplary and/or preferred modules for implementing the processes described in this disclosure. These modules may be hardware units (such as a central processor, a field programmable gate array, a digital signal processor, or an application specific integrated circuit, etc.) and/or software modules (such as a computer-readable program). The modules for implementing the steps described below are not described in detail above. However, as long as there is a step to perform a certain process, there may be a corresponding module or unit (implemented by hardware and/or software) for performing the same process. The technical solutions defined by the steps described below and all combinations of units corresponding to these steps are included in the disclosure of the present disclosure, as long as these technical solutions constituted thereby are complete and applicable.

In addition, a device composed of various units may be incorporated as a functional module into a hardware device such as a computer. In addition to these functional modules, the computer can of course have other hardware or software components.

6. Communication Method for a Receiving Side According to an Embodiment of the Present Disclosure FIG. 6 shows a flowchart of a communication method 600 for an electronic device on a receiving side according to an embodiment of the present disclosure. The communication method 600 may be executed by the electronic device 500 as described in FIG. 5, for example.

As shown in FIG. 6, in step S601, a second one-dimensional sequence of modulation symbols is acquired. According to one embodiment of the present disclosure, the second one-dimensional sequence of modulation symbols can be acquired via the communication unit 501 of the electronic device 500. Step S601 may be executed by the processing circuit 503 of the electronic device 500, for example.

The second one-dimensional sequence of modulation symbols may include a complex modulation symbol sequence received within one or more symbol intervals. Since the complexity of the reception process increases as the number of complex modulation symbols included in the second one-dimensional sequence of modulation symbols increases, the number of complex modulation symbols included in the second one-dimensional sequence of modulation symbols can be determined according to processing capability for example.

According to one embodiment of the present disclosure, the second one-dimensional sequence of modulation symbols may include only complex modulation symbols within one symbol interval. For example, in order to be compatible with an OFDM system, the second one-dimensional sequence of modulation symbols may correspond to a group of complex modulation symbols transmitted on multiple subcarriers within one OFDM symbol interval. More specifically, if the number of subcarriers used by the OFDM system is N, the second one-dimensional sequence of modulation symbols includes N complex modulation symbols transmitted using these multiple subcarriers within one OFDM symbol interval. This allows the new waveform of the present disclosure to share part of the transmitting and receiving devices with the existing OFDM waveform, thereby advantageously reducing processing complexity, simplifying the system structure, and reducing application costs, so as to be implemented on a handheld device such as a smartphone. In addition, on the receiving side, the reception process can be completed within one OFDM symbol interval, without waiting for the reception of all complex modulation symbols in multiple symbol intervals before performing the overall processing, which extends the inherent processing format of the OFDM system, and which avoids introduction of endogenous system delay.

After acquiring the second one-dimensional sequence of modulation symbols, in step S602, a post-processing operation is performed on the second one-dimensional sequence of modulation symbols to obtain a third one-dimensional sequence of modulation symbols. Step S602 can be performed by the processing circuit 503 of the electronic device 500, more specifically, by the post-processing unit 504.

As shown in FIG. 6, step S602 may further include sub-steps S604, S605, and S606. In sub-step S604, perform a second dimension-increasing conversion to convert the second one-dimensional sequence of modulation symbols into a third multi-dimensional modulation symbol block. In sub-step 605, transform the third multi-dimensional modulation symbol block into a fourth multi-dimensional modulation symbol block with a second coupling transformation, wherein the second coupling transformation couples modulation symbols in the third multi-dimensional modulation symbol block with each other. In sub-step 606, perform a second dimension-decreasing conversion to convert the fourth multi-dimensional modulation symbol block into a third one-dimensional sequence of modulation symbols, wherein the second dimension-decreasing conversion is an inverse process of the second dimension-increasing conversion in S604. Steps S604, S605, and S606 can be performed by the processing circuit 503 of the electronic device 500, more specifically, by the second dimension-increasing conversion unit 504A, the second coupling transformation unit 504B, and the second dimension-decreasing conversion unit 504C included in the pre-processing unit 504, respectively. There are coupling association between symbols in the third one-dimensional sequence of modulation symbols obtained through step S602. Therefore, the processing on the receiving side further obtains diversity gains for countering the Doppler frequency offset, which makes it have improved performance in fast time-varying channels.

The second dimension-increasing conversion may be any conversion capable of mapping each modulation symbol in the second one-dimensional sequence of modulation symbols to a corresponding position in the third multi-dimensional modulation symbol block one by one. For example, the second dimension-increasing conversion may be any of the various dimension-increasing conversions described in Section 4.2 regarding the first dimension-increasing conversion, so it can be understood with reference to Section 4.2 and the part that duplicates with Section 4.2 will not be repeated here again. In fact, the receiving side may not know which kind of dimension-increasing conversion is adopted on the transmitting side during the post-processing operation. In one preferred embodiment, considering the symmetry of a transmitting side and a receiving side of a system, a second dimension-increasing conversion that is the same as the first dimension-increasing conversion used on the transmitting side can be adopted on the receiving side. In another embodiment, the second dimension-increasing conversion may also be different from the first dimension-increasing conversion performed on the transmitting side.

The second coupling transformation may be any transformation capable of coupling modulation symbols in the third multi-dimensional modulation symbol block with each other. For example, the second coupling transformation may be any of the various coupling transformations described in Section 4.3, so it can be understood with reference to Section 4.3 and the part that duplicates with Section 4.3 will not be repeated here again. The second coupling transformation may be of the same type as or a different type from the first coupling transformation performed on the transmitting side. For example, when the first coupling transformation is a DSFT transform, the second coupling transformation may be an IDSFT transformation or a wavelet transform. In addition, the sizes of the multi-dimensional modulation symbol blocks involved by the second coupling transformation and the first coupling transformation may also be different. For example, the first multi-dimensional symbol block involved by the first coupling transformation may be $K_1 \times L_1$, while the first multi-dimensional symbol block involved by the second coupling transformation may be $K_2 \times L_2$, where $K_1$ and $K_2$ are different, and $L_1$ and $L_2$ are different.

In one embodiment, considering the symmetry of a transmitting side and a receiving side of a system, a second coupling transformation performed on the receiving side may be an inverse transformation of the first coupling transformation performed on the transmitting side, which makes it possible to better recover the modulation symbols transmitted by the transmitting side on the receiving side. For example, if the Discrete Symplectic Fourier Transform (DSFT) is used as the first coupling transformation in the pre-processing operation on the transmitting side, then the Inverse Discrete Symplectic Fourier Transform (IDSFT) can be used as the second coupling transformation in the post-processing operation on the receiving side, in which IDSFT is used to apply a multi-dimensional inverse Fourier transform to each row in the third multi-dimensional modulation symbol block, and a multi-dimensional Fourier transform to each column. When the second coupling transformation is not an inverse transformation of the first coupling transformation, the performance may be slightly different depending on the channel.

The second dimension-decreasing conversion is an inverse process of the second dimension-increasing conversion, which maps each modulation symbol in the fourth multi-dimensional modulation symbol block back to a corresponding position in the third one-dimensional sequence of modulation symbols one by one. For example, the second dimension-decreasing conversion may be any of the various dimension-decreasing conversions described in Section 4.4 regarding the first dimension-decreasing conversion, so it can be understood with reference to Section 4.4 and the part that duplicates with Section 4.4 will not be repeated here again. In one embodiment, a second dimension-decreasing conversion that is the same as the first dimension-decreasing conversion used on the transmitting side can be adopted on the receiving side. In another embodiment, the second dimension-decreasing conversion may be different from the first dimension-decreasing conversion performed on the transmitting side.

As mentioned above, according to an embodiment of the present disclosure, the second dimension-increasing conversion, the second coupling transformation, and the second dimension-decreasing conversion in the post-processing operation on the receiving side may be different from, or the same as the first dimension-increasing conversion, the first coupling transformation, and the first dimension-decreasing conversion in the pre-processing operation on the transmitting side, respectively. They may not have a reciprocal relationship, or may have some other certain association. In principle, if f is used to denote a transformation performed by a pre-processing operation on a transmitting side (including dimension-increasing, coupling, and dimension-decreasing), h is used to denote a transformation performed by a physical channel, and g is used to denote a transformation performed by a post-processing operation (including dimension-increasing, coupling, and dimension-decreasing), then the overall equivalent transformation undergone by a signal is g*h*f. The overall equivalent transformation g*h*f can be inverted on a receiving side during channel equalization. Therefore, in principle, it is not required that the post-processing operation g on the receiving side and the pre-processing operation f on the transmitting side are reciprocal or have some other certain association. That is to say, the post-processing operation on the receiving side and the pre-processing operation on the transmitting side do not need to cooperate with each other in the kind of transformation used. In a preferred embodiment, g and f can be made to be inverse transformation with each other, which can make g*h*f to obtain a symmetric structure, thereby facilitating signal processing.

Additionally or optionally, after the post-processing operation in step S602 converts the second one-dimensional sequence of modulation symbols into a third one-dimensional sequence of modulation symbols, a channel equalization operation can be performed in step S603. The channel equalization operation can improve the transmission performance in fading channels, for example, eliminating or reducing the inter-symbol crosstalk (ISI) issue caused by multipath delay in broadband communication. According to one embodiment of the present disclosure, the channel equalization operation is performed for an equivalent channel. The equivalent channel describes the transmission relationship between a complex modulation symbol sequence on a transmitting side (for example, a first one-dimensional sequence of modulation symbols) and a third one-dimensional sequence of modulation symbols on a receiving side. That is, when performing the channel equalization operation, the equivalent channel can be determined at least according to the pre-processing operation on the transmitting side, the actual physical channel, and the post-processing operation on the receiving side. Step S603 is optional, and thus is shown as a dotted box.

Additionally or optionally, the communication method 600 may further include a step of determining whether to enable the post-processing operation. This step can be performed before step S602, for example. This step can be performed by the processing circuit 503 of the electronic device 500, more specifically, by the post-processing enabling unit 506. When it is determined that the post-processing operation would not be enabled, this generally corresponding to the case that there is no pre-processing operation performed on the transmitting end, the method 600 may skip step S602. In this case, the channel equalization operation can be performed directly on the second one-dimensional sequence of modulation symbols in step S603.

Additionally or optionally, the communication method 600 may further include a demodulation step (not shown) for the third one-dimensional sequence of modulation symbols, so as to recover the bit stream transmitted on a transmitting side. Depending on the specific manner in which the bit stream to be transmitted is mapped into complex modulation symbols on the transmitting side, further demodulation operation performed on the receiving side may include corresponding demodulation operation such as QPSK demodulation or QAM demodulation, etc. For example, when the QPSK modulation described in relation to FIG. 4A is used on a transmitting side, a corresponding QPSK demodulation operation can be performed on a receiving side accordingly so as to recover the transmitted bit stream.

As it can be seen, by performing a post-processing operation including a second dimension-increasing conversion, a second coupling transformation, and a second dimension-decreasing conversion on a receiving side, the electronic device and the communication method according to the embodiments of the present disclosure can counter the Doppler effect in fast time-varying physical channels, while at the same time having the complexity and system delay that are suitable for implementation in an actual system.

7. A General Communication Method According to an Embodiment of the Present Disclosure The communication methods 300 and 600 on a receiving side and a transmitting side have been described above, respectively. FIG. 7A further shows a flowchart of a general communication method 700 according to an embodiment of the present disclosure. The communication method 700 may be executed by the electronic device 200 described with reference to FIG. 2 in cooperation with the electronic device 500 described with reference to FIG. 5, for example.

As shown in FIG. 7A, in step S701, a pre-processing operation is performed on the first one-dimensional sequence of modulation symbols to obtain a second one-dimensional sequence of modulation symbols. As previously described, the first one-dimensional sequence of modulation symbols may come from a QPSK modulator, QAM modulator, or other modulator. The pre-processing operation described in Section 4 can be used. The pre-processing operation can include: performing a first dimension-increasing conversion to convert the first one-dimensional sequence of modulation symbols into a first multi-dimensional modulation symbol block; transforming the first multi-dimensional modulation symbol block into a second multi-dimensional modulation symbol block with a first coupling transformation, wherein the first coupling transformation couples symbols in the first multi-dimensional modulation symbol block with each other; and performing a first dimension-decreasing conversion to convert the second multi-dimensional modulation symbol block into a second one-dimensional sequence of modulation symbols, wherein the first dimension-decreasing conversion is an inverse process of the first dimension-increasing conversion.

In step S702, the second one-dimensional sequence of modulation symbols is transmitted. The second one-dimensional sequence of modulation symbols may be transmitted using a single carrier system or a multi-carrier system. In order to make the second one-dimensional sequence of modulation symbols suitable for radio transmission using a single carrier system or a multi-carrier system, step S702 may include further operations on the second one-dimensional sequence of modulation symbols. For example, when using an OFDM system to transmit a second one-dimensional sequence of modulation symbols, step S702 may include at least a part of the conventional OFDM modulation process.

In step S703, the transmitted second one-dimensional sequence of modulation symbols is acquired.

In step S704, a post-processing operation is performed on the acquired second one-dimensional sequence of modulation symbols to obtain a third one-dimensional sequence of modulation symbols. The post-processing operation may include: performing a second dimension-increasing conversion to convert the second one-dimensional sequence of modulation symbols into a third multi-dimensional modulation symbol block; transforming the third multi-dimensional modulation symbol block into a forth multi-dimensional modulation symbol block with a second coupling transformation, wherein the second coupling transformation couples symbols in the third multi-dimensional modulation symbol block with each other; and performing a second dimension-decreasing conversion to convert the forth multi-dimensional modulation symbol block into a third one-dimensional sequence of modulation symbols, wherein the second dimension-decreasing conversion is an inverse process of the second dimension-increasing conversion.

Additionally or optionally, the method 700 may further include the step S705 of channel equalization. According to one embodiment of the present disclosure, the channel equalization operation can be for an equivalent channel between the first one-dimensional sequence of modulation symbols and the third one-dimensional sequence of modulation symbols. The equivalent channel can include, for example, an equivalent transmission relationship formed together by the pre-processing operation in step S701, the actual physical transmission channel, and the post-processing operation in step S705. Step S705 is optional and therefore shown as a dotted box.

Additionally or optionally, the method 700 may further include a step S706 of determining whether to enable a pre-processing operation or a step S707 of determining whether to enable a post-processing operation. Steps S706 and S707 are optional, and thus are shown as dashed boxes. The detailed description regarding the steps for enabling a pre-processing operation or enabling a post-processing operation can be referenced to Section 10. When it is determined that the pre-processing operation would not be enabled, step S701 may be omitted. Information on whether the pre-processing operation should be enabled may be included in an indication information and sent to the receiving side to indicate whether the receiving side should enable the post-processing operation accordingly. When it is determined that the post-processing operation would not be enabled, step S705 may be omitted. Accordingly, the step of channel equalization may similarly determine the equivalent channel according to whether the pre-processing operation and/or the post-processing operation are enabled.

8. An Embodiment Using a Multi-Carrier System

FIG. 7B shows a block diagram of a communication system 700B according to an embodiment of the present disclosure. An exemplary embodiment according to the present disclosure will be further described below with reference to FIG. 7B for a multi-carrier system. It should be noted that, although only a multi-carrier system is described here, the principle and methods of the present disclosure are also applicable to a single carrier system, as explained in Section 4 above. A person of ordinary skill in the art can expand this embodiment to apply to a single carrier system.

A N×1 modulation symbol sequence to be transmitted can be represented by x. According to one embodiment of the present disclosure, the modulation symbol sequence x may correspond to a plurality of modulation symbols (e.g., QPSK symbols or QAM symbols) to be transmitted within one symbol interval. As already explained above, processing in units of modulation symbols within one symbol interval can reduce the system complexity and avoid causing endogenous system delay.

The x can undergo a pre-processing operation on a transmitting side. As shown in FIG. 7B, during the pre-processing operation, the modulation symbol sequence x may first be subjected to a first dimension-increasing conversion. For example, each modulation symbol in the modulation symbol sequence x may be mapped into a K×L two-dimensional modulation symbol block X in accordance with a certain mapping relationship. Wherein, the values of K and L can be selected according to specific needs and processing capabilities, and only need to satisfy K×L=N.

Then, the pre-processing operation may perform a first coupling transformation, for example, DSFT transformation, with corresponding dimension on the two-dimensional modulation symbol block X. The DSFT transformation on the two-dimensional modulation symbol block X can be expressed as:

$$\tilde{S} = F_K^H \cdot X \cdot F_L = [\tilde{s}_1 \tilde{s}_2 \ldots \tilde{s}_L]$$

Wherein, $F_K^H$ represents a K-order inverse Fourier transform (IFFT) matrix, $F_L$ represents a L-order Fourier transform (FFT) matrix, and g represents the K×L two-dimension symbol block obtained after the DSFT transformation, while $\tilde{s}_i$ is the i-th column of $\tilde{S}$.

Next, the pre-processing operation may perform a first dimension-decreasing conversion on the two-dimensional modulation symbol block $\tilde{S}$ to reorder it into a N×1 modulation symbol sequence vec($\tilde{S}$). The first dimension-decreasing conversion here may be an inverse process of the first dimension-increasing conversion for the modulation symbol sequence x. vec($\tilde{S}$) can be expressed as:

$$vec(\tilde{S}) = \begin{bmatrix} \tilde{s}_1 \\ \vdots \\ \tilde{s}_L \end{bmatrix} = (F_L \otimes F_K^H) \cdot vec(\tilde{X}) = (F_L \otimes F_K^H) \cdot x$$

Wherein, the operator "⊗" means Kronecker product operation.

The vec($\tilde{S}$) obtained from the pre-processing operation can be transferred to a transmitter of a multi-carrier system for transmission. For example, the OFDM transmitter of the OFDM system described with reference to FIG. 1C can be used for transmission of vec($\tilde{S}$). When the OFDM transmitter is used for transmission of vec($\tilde{S}$), an IFFT transformation, CP addition, and subsequent processing (such as digital-to-analog conversion, up-conversion) etc. as described in FIG. 1C can be performed further on vec($\tilde{S}$).

The transmitted radio signal is transmitted through a physical channel. FIG. 7C is a schematic diagram of a digital signal model at the transmitting and receiving ends under a time-varying multipath physical channel. As shown in FIG. 7C, signals s transmitted by a transmitting side are superimposed on each other after experiencing different delays in three paths in a physical channel, thereby obtaining the signal r received by a receiving side. The time variability of the physical channel is reflected in the time-varying path gain (denoted by $\alpha_1$, $\alpha_2$, and $\alpha_3$) of each path. In addition, each path has a different Doppler frequency offset, denoted by $v_1$, $v_2$, and $v_3$, respectively. It should be noted that, although the signal transmission paths are shown to be three in FIG. 7C, there may be more or fewer transmission paths.

The transmitted radio signals are transmitted to a receiver of a multi-carrier system through physical channels. For example, the receiver may be an OFDM receiver described with respect to FIG. 1C. The OFDM receiver can perform down-converting, sampling, and CP removal on the received radio signals to obtain the received signal r. As explained earlier, r is a linearly weighted sum of the transmitted signals experiencing delays in various paths with time-varying path gains and Doppler factors as weight coefficients. When the modulation symbol sequence vec($\tilde{S}$) is transmitted by a transmitting side, the digital signal r received by a receiving side can be expressed as:

$$r = H \cdot vec(\tilde{S}) + z$$

Wherein H is the physical channel that contains CP-related operations, r is the digital received signal after digitizing processing such as down conversion and sampling at the receiving end, and z is the noise at the receiving end. Optionally, the digital signal r can also be processed by FFT transformation and the like. Therefore, the digitized received signal $\tilde{r}$ corresponding to the transmitted modulation symbol sequence vec($\tilde{S}$) can be expressed as:

$$\tilde{r} = F_N \cdot H \cdot vec(\tilde{S}) + F_N \cdot z$$

Wherein, $F_N$ represents N-order FFT matrix, $\tilde{r}$ represents the digital received signal after FFT processing, $\tilde{r}$ is a N×1 modulation symbol sequence. When vec($\tilde{S}$) corresponds to multiple modulation symbols transmitted by a multi-carrier system within one modulation symbol interval, $\tilde{r}$ may correspond to a modulation symbol sequence composed of multiple modulation symbols received within one modulation symbol interval.

The modulation symbol sequence $\tilde{r}$ may undergo a post-processing operation on a receiving side. During the post-processing operation, first, a second dimension-increasing conversion can be performed on the modulation symbol sequence $\tilde{r}$, thereby arranging it into a K×L two-dimensional modulation symbol block $\tilde{R}$, which satisfies vec($\tilde{R}$)=$\tilde{r}$. The second dimension-increasing conversion performed on a receiving side may be the same as or different from the first dimension-increasing conversion on a transmitting side.

Then, the post-processing operation may perform a second coupling transformation on $\tilde{R}$. According to one embodiment of the present disclosure, the second coupling transformation can be an IDSFT transformation, that is, can be an inverse transformation of the DSFT transformation on the transmitting side, which may enable the receiving side to correctly recover the transmitted modulation symbols to the greatest extent. The IDSFT transformation on $\tilde{R}$ can be expressed as:

$$\tilde{Y}=F_K \cdot \tilde{R} \cdot F_L^H$$

Wherein, $F_K$ represents a K-order FFT transformation, $F_L^H$ represents a L-order IFFT transformation, and $\tilde{Y}$ represents a two-dimensional modulation symbol block as a result.

Subsequently, the post-processing operation can perform a second dimension-decreasing conversion on the two-dimensional modulation symbol block $\tilde{Y}$. The second dimension-decreasing conversion may be an inverse process of the second dimension-increasing conversion performed on $\tilde{r}$, so that the two-dimensional modulation symbol block $\tilde{Y}$ is rearranged into a N×1 dimension modulation symbol sequence y according to the reverse order of the order of the second dimension-increasing conversion. According to the mathematical nature of Kronecker product, we can get:

$$y=\tilde{H}_{eq} \cdot x + \tilde{z}$$

Wherein $\tilde{z}$ is a N×1 vector representing the processed noise. $\tilde{z}$ can be expressed as:

$$\tilde{z}=(F_L^H \otimes F_K)F_N z$$

$\tilde{H}_{eq}$ is a N×N matrix, representing the equivalent channel between the original modulation symbol sequence x transmitted by a transmitting side and the modulation symbol sequence y after a post-processing operation at a receiving side. $\tilde{H}_{eq}$ can be expressed as:

$$\tilde{H}_{eq}=[(F_L^H \otimes F_K)F_N] \cdot H \cdot [F_N^H(F_L \otimes F_K^H)]$$

Here "$\otimes$" represents Kronecker product operation, H represents the actual physical channel.

Optionally, after the post-processing operation on the receiving side is completed, the modulation symbol sequence y may be equalized according to the equivalent transmission matrix $\tilde{H}_{eq}$, so that the original modulation symbol sequence x is directly recovered under a certain signal-to-noise ratio condition. Considering the complexity of equalization, an actual system can use linear equalization criteria which are easy to implement. According to one embodiment, an equalization operation based on the zero-forcing (ZF) criterion can be used, and the equalization matrix can be expressed accordingly as:

$$Q_{ZF}=\tilde{H}_{eq}^{-1}$$

According to another embodiment, an equalization operation based on the minimum mean square error (MMSE) criterion can be used, and the equalization matrix can be expressed accordingly as:

$$Q_{MMSE}=(\tilde{H}_{eq}^H \tilde{H}_{eq}+\gamma I_N)^{-1}\tilde{H}_{eq}^H$$

Wherein $\gamma$ is the normalization factor defined according to the MMSE criterion, $I_N$ is a N-order identity matrix.

As can be seen from the above description, due to the existence of the processing matrix $[F_N^H(F_L \otimes F_K^H)]$ of the pre-processing operation and the processing matrix $[(F_L^H \otimes F_K)F_N]$ of the post-processing operation, in the equivalent channel (represented with $\tilde{H}_{eq}$), respective elements, especially respective elements transmitted within one symbol interval, are coupled with each other, which can obtain part of diversity gains for countering Doppler frequency offset, thereby obtaining a performance improvement.

In addition, when the input to a pre-processing operation (that is, the modulation symbol sequence x) includes only modulation symbol sequences to be transmitted within one symbol interval, since there is no joint processing on a plurality of modulation symbol sequences across symbol intervals, it will not cause endogenous system delay. That is to say, a receiving side can immediately demodulate when it receives a modulation symbol sequence within the current symbol interval without waiting for modulation symbol sequences within subsequent symbol intervals. In addition, it can be seen from the dimension of the equivalent channel that $\tilde{H}_{eq}$ is a N×N matrix. This makes the complexity of channel equalization only slightly higher than OFDM systems that do not use pre-processing and post-processing operations. Therefore, the present disclosure can be easily implemented on an actual system, which is particularly important for handheld devices.

9. Embodiments for Other Systems

Although the present disclosure mainly describes example embodiments according to the present disclosure for an OFDM system, it will be clear that the principles and methods of the present disclosure can also be applied to other multi-carrier system, such as a code division multiple access (CDMA) system.

The CDMA system uses different orthogonal codes as carriers, thereby using the same time-frequency resource to serve multiple users. When the method according to the present disclosure is implemented based on a CDMA system, data for different users can be modulated separately. For each determined user, the processing method is basically the same as the aforementioned OFDM-based system, that is, the user data is spread (spreading is the operation of the CDMA system itself) to obtain the bit stream to be transmitted, and then, through constellation point mapping, a serial modulation symbol stream is obtained. The serial modulation symbol stream can be divided into a plurality of modulation symbol sequences as described above. For each modulation symbol sequence, except that the IFFT operation before transmission is not required (the CDMA system does not need this operation), other processes are consistent with that for an OFDM-based system. Such processes are performed on each user's data, that is, each user's data is represented as such a two-dimensional modulation symbol block, and then a pre-processing operation is performed on each two-dimensional modulation symbol block, and then, the modulation symbols to be transmitted after the pre-processing operation for each user are superimposed together and transmitted through radio signal. After receiving the superimposed radio signals, the receiving side first uses the principle of CDMA system orthogonal codes to separate the data for each user, and then can perform demodulation using the method described in an OFDM-based system implementation (no FFT operation is required).

Therefore, the method and apparatus according to the present disclosure can be applied to a multi-carrier system using frequency division multiplexing technology or code division multiple access technology, for example, a multi-carrier system using any one of orthogonal frequency division multiplexing (OFDM) technology, frequency domain spread multi-carrier code division multiple access technology, single carrier frequency division multiple access technology, orthogonal multi-carrier direct sequence code division multiple access technology, multi-frequency direct sequence code division multiple access technology, generalized multi-carrier direct sequence code division multiple access technology, time-hopping multi-carrier code division multiple access technology, time-frequency domain spread multi-carrier direct sequence code division multiple access technology.

In addition, in addition to a communication system for terrestrial communication, the electronic device and the communication method according to embodiments of the present disclosure can also be applied to a communication scenario of a low-orbit satellite constellation. The satellites in the low-orbit constellation orbit fastly, and the high-speed relative movement compared to the earth will produce a strong Doppler frequency offset, at the same time, due to the low orbit height, there is a multipath effect, therefore, the electronic devices and communication methods according to the embodiments of the present disclosure can be adapted to such a communication scenario. In addition, the communication distance in the satellite communication scenario is much greater than that in the ground communication, and the communication delay problem becomes more significant. The OTFS system itself has a fixed system delay, which is not conducive to use in satellite communication scenarios with large delays, while the electronic devices and the communication methods according to the embodiments of the present disclosure have no system delay, which is more advantageous in this respect.

10. Enabling a Pre-Processing Operation and a Post-Processing Operation According to an Embodiment of the Present Disclosure According to an embodiment of the present disclosure, whether to enable the aforementioned pre-processing operation and/or post-processing operation can be determined according to various factors. This makes it possible to flexibly choose whether to use a conventional communication method or an improved communication method with a pre-processing operation and a post-processing operation as needed, so as to better adapt to actual application scenarios. This determination can be performed by the processing circuits 203, 503. For example, since one of the purposes of the pre-processing operation and/or the post-processing operation is to better counter Doppler frequency offset, in scenarios where the Doppler frequency offset is not significant, the pre-processing operation and/or the post-processing operation may not be enabled.

According to one embodiment of the present disclosure, it is possible to determine whether to enable the pre-processing operation before the pre-processing operation is performed on the transmitting side. This determination may be based on various factors. According to one embodiment, whether the pre-processing operation should be enabled can be determined based on the channel condition. The channel condition may include the intensity of the Doppler effect of a channel. The intensity of the Doppler effect may be measured, for example, by the spread and offset of a reference signal in the frequency domain. When the Doppler effect is strong enough (for example, the Doppler frequency offset exceeds the threshold), the pre-processing operation can be enabled. According to another embodiment, whether the pre-processing operation should be enabled can be determined based on the application scenario. For example, when it is determined that the application scenario is any one of high-speed train communication, aircraft communication or satellite communication, or other high-speed mobile scenarios, the pre-processing operation can be enabled. For another example, when the mobility (such as speed) of the communication device is higher than a predetermined threshold, the pre-processing operation can be enabled. According to still another embodiment, whether the pre-processing operation should be enabled on the transmitting side can be determined based on the specific request sent by the receiving side. For example, in response to receiving a request sent by the receiving side to enable pre-processing, the pre-processing operation can be enabled on the transmitting side.

According to one embodiment of the present disclosure, the electronic device on the transmitting side may transmit indication information, which may indicate whether the pre-processing operation shall be enabled on the transmitting side, thereby indicating whether the electronic device on the receiving side should enable the post-processing operation accordingly and configure channel equalization operation accordingly. According to a further embodiment of the present disclosure, the indication information may also include parameters and/or type of the pre-processing operation, such as the dimensional parameters (two-dimension or higher) of the first multi-dimensional modulation symbol block, the size of each dimension of the first multi-dimensional modulation symbol block, and the type of coupling transformation (such as DSFT transformation). According to other embodiments of the present disclosure, these parameters of the pre-processing operation are static parameters agreed in advance, and therefore may not be included in the indication information.

The indication information can be transmitted in various ways. According to one embodiment, the indication information is included in, for example, the downlink control information DCI specified by the 3GPP standard. For example, a waveform selection variable can be added to the DCI, when a user moves at high speed and causes channel time-varying significant, the base station can use the value of the waveform selection variable to inform the user that pre-processing and post-processing operations will be enabled, for example, waveform selection variable of 0 means that the OFDM waveform is used, and a waveform selection variable of 1 means that usage of the new waveform of the present disclosure needs to enable pre-processing and post-processing operations; and when the Doppler effect in the environment is not obvious, the base station can notify the user to use the normal waveform instead of enabling pre-processing and post-processing operations. In this way, it is possible to support a variety of communication scenarios where waveforms are dynamically switched as needed, thereby enabling flexible choice in terms of calculation overhead and transmission performance. According to another embodiment, the indication information may also be included in higher layer signaling, such as the radio resource control RRC message specified by the 3GPP standard, thereby saving physical layer signaling and supporting semi-static waveform switching.

According to one embodiment of the present disclosure, it is possible to determine whether to enable the post-processing operation before the post-processing operation is performed on the receiving side. This determination may be based on various factors. According to one embodiment, whether the post-processing operation should be enabled on the receiving side can be determined based on the received indication information, which includes at least information about whether the post-processing operation should be enabled. For example, the indication information may be the indication information transmitted by the transmitting side described above. When the indication information indicates that the pre-processing operation is enabled on the transmitting side, the post-processing operation can be enabled on the receiving side accordingly. Otherwise, the post-processing operation may not be enabled on the receiving side. The indication information can be acquired from the downlink control information DCI or the radio resource control RRC message at the receiving side.

According to another embodiment of the present disclosure, the processing circuit 503 of the electronic device on the receiving side can further determine whether to send a post-processing operation enabling or, in other words, a new waveform enabling request to the electronic device 200 on the transmitting side. This determination can be based on the channel condition. The channel condition may include the intensity of the Doppler effect of a channel. The intensity of the Doppler effect may be measured, for example, by the spread and offset of a reference signal in the frequency domain. When the Doppler effect is strong enough (for example, the Doppler frequency offset exceeds the threshold), a request to enable the post-processing operation can be sent. According to another embodiment, whether to send a request to enable the post-processing operation can be determined based on the application scenario. For example, when it is determined that the application scenario is any one of high-speed train communication, aircraft communication or satellite communication, or other high-speed mobile scenarios, a request to enable the post-processing operation may be sent. Whether the post-processing operation should be enabled on the receiving side can be determined according to the response from the transmitting side for the request. For example, if an electronic device on the transmitting side enables the pre-processing operation on the transmitting side in response to the request, an electronic device on the receiving side may be instructed by the indication information to enable the post-processing operation accordingly. Otherwise, the electronic device on the receiving side may not enable the post-processing operation.

FIGS. 8A and 8B show schematic diagrams for determining whether to enable a pre-processing operation and/or a post-processing operation according to an embodiment of the present disclosure. Wherein, the transmitting-side device 801 can be the electronic device 200 for the transmitting side described with reference to FIG. 2, and the receiving-side device 802 can be the electronic device 500 for the receiving side described with reference to FIG. 5.

In FIG. 8A, in step S803, the receiving-side device 802 may send a request to the transmitting-side device 801 to request the transmitting-side device to enable the pre-processing operation. As previously described, the receiving-side device 802 may send the request based at least on one of channel conditions or application scenarios.

In step S804, in response to receiving the request, the transmitting-side device 801 may determine whether the pre-processing operation should be enabled on the transmitting side. According to one embodiment of the present disclosure, whether the pre-processing operation should be enabled on the transmitting side can be determined in combination with channel conditions or application scenarios.

When the transmitting-side device 801 determines to enable the pre-processing operation, the pre-processing operation is enabled in S805. The parameters of the pre-processing operation may be further determined, such as the dimensional parameters of the first multi-dimensional modulation symbol block, the size of each dimension of the first multi-dimensional modulation symbol block, and the type of coupling transformation, and so on. These parameters can be static parameters agreed in advance, or can be determined dynamically as needed.

In step S806, the transmitting-side electronic device 801 may send indication information to the receiving-side electronic device 802. The indication information may indicate whether the transmitting-side device 801 has enabled the pre-processing operation. The indication information may also include parameters of the pre-processing operation.

In response to receiving the indication information from the transmitting-side device 801, the receiving-side device 802 may enable and/or may not enable the post-processing operation accordingly. When it is determined that the post-processing operation should be enabled, the receiving-side device 802 may configure the post-processing operation according to the parameters regarding the pre-processing operation included in the indication information and enable the post-processing operation in step S807. For example, it is possible to make the post-processing operation and the pre-processing operation symmetrical (although not necessary), which, for example, allows the dimension and/or size of the third multidimensional modulation symbol block to be the same as the dimension of the first multidimensional modulation symbol block, uses the second coupling transformation corresponding to the first coupling transformation on the transmitting side, etc.

Alternatively or additionally, the receiving-side device 802 may send a confirmation for enabling the post-processing operation to the transmitting-side device 801 in step S808.

Unlike FIG. 8A, in FIG. 8B, rather than determining whether the pre-processing operation should be enabled in response to a request from the receiving-side device, the transmitting-side device makes such determination independently. As described earlier, this determination made by the transmitting-side device may be based at least on one of application scenarios or channel conditions. The other steps in FIG. 8B can be similar to FIG. 8A and will not be described in detail here again.

The embodiments shown in FIGS. 8A and 8B enable the transmitting-side device and the receiving-side device to determine whether the pre-processing operation and the post-processing operation should be enabled. This allows these devices to flexibly choose whether to use conventional communication methods or improved communication methods with pre-processing and post-processing operations according to their needs, so that they can better adapt to actual application scenarios.

11. Performance Comparison

In order to illustrate the performance of the communication method and the electronic device according to the present disclosure, the inventors have performed performance simulations on an exemplary system according to an embodiment of the present disclosure, a conventional OFDM system, and an existing OTFS system. The following table shows the specific simulation parameters.

| Parameters | Value |
| --- | --- |
| Carrier frequency | 2 GHz |
| Subcarrier frequency spacing | 15 kHz |
| CP length | 7% |
| Number of subcarriers | 256 |
| Number of FFT points | 256 |
| Size of 2D symbol block to be transmitted | 32 × 8 |
| Maximum Doppler frequency offset | 1 kHz |

The performance of each system for countering Doppler frequency offset under time-varying channels is compared through the simulation of the bit error rate. FIG. 9 shows simulation results of bit error rate performance of each system in the case of using QPSK constellation for constellation point mapping. Wherein, the x-axis represents the signal-to-noise ratio (SNR) conditions during the simulation, and the y-axis represents the bit error rate (BER) performance obtained from the simulation. Curves 9001, 9002, and 9003 represent the bit error rate performance curves of the OFDM system, the OTFS system, and the exemplary system according to an embodiment of the present disclosure, respectively. FIG. 10 shows a comparison of bit error rate performance of various systems in the case of using 16 QAM constellation for constellation point mapping. Wherein, the x-axis represents the signal-to-noise ratio (SNR) conditions during the simulation, and the y-axis represents the bit error rate (BER) performance obtained from the simulation. Curves 1001, 1002, and 1003 respectively represent bit error rate performance curves of the OFDM system, the OTFS system, and the exemplary system according to an embodiment of the present disclosure. As can be seen from FIGS. 9 and 10, the exemplary system according to an embodiment of the present disclosure has a lower error rate than the conventional OFDM system.

Further, the following table gives a quantitative comparison of the above three systems in terms of system delay and complexity. Consider transmitting M modulation symbol sequences within M consecutive symbol intervals, each modulation symbol sequence having N modulation symbols. Then, the system delay, equalization complexity, and additional computational complexity of the three systems can be expressed as:

| | system delay | equalization complexity | additional computational complexity |
| --- | --- | --- | --- |
| OFDM system | 0 | T (N) | 0 |
| OTFS system | M | T(MN) | 0 (MN log MN) |
| System according to an embodiment of the present disclosure | 0 | T (N) | 0 (MN log N) |

Wherein, the symbol T(n) is used to represent the number of calculations required to solve a problem of scale n; the symbol O(·) is called the Big O Notation, which is used to represent the asymptotic upper bound of the order of a function, that is, the dominant part in the calculation operation when the scale of the problem expands infinitely.

As can be seen from the above comparison, in terms of system delay, since the system according to an embodiment of the present disclosure can only process the modulation symbol sequence within the current symbol interval, there is no system delay, just like the OFDM system, while the OTFS system requires a receiving end to receive all modulation symbol sequences within M consecutive symbol intervals before the subsequent demodulation work can be performed, so there is a system delay of M symbol intervals.

In terms of equalization complexity, since the system according to an embodiment of the present disclosure only needs to equalize modulation symbol sequences within the current symbol interval, the scale of the equalization complexity is T(N), just like the OFDM system. OTFS system needs to equalize all M modulation symbol sequences, so the scale of equalization complexity is T(MN).

In terms of additional computational complexity, taking the OFDM system as a reference standard, the additional computational complexity introduced by the pre-processing and post-processing operations of the system according to the embodiments of the present disclosure is O(MN log N), which is lower than the additional computational complexity O(MN log MN) introduced by the OTFS system.

Inventors further simulate the implementation complexity of the three systems. FIG. 11 and FIG. 12 show the average times of running of program modules for simulating each system in the case of using N=128 subcarriers and N=256 subcarriers, respectively. In FIGS. 11 and 12, the horizontal axis represents the number of modulation symbol sequences transmitted, and the vertical axis represents the relative running times of the program execution modules that simulate the three systems. The running times reflect the implementation complexities of the above three systems. As it can be seen that, although the bit error rate of the exemplary system according to an embodiment of the present disclosure is slightly higher than that of the OTFS system, the implementation complexity of the system (represented by curves 1103, 1203) is only slightly higher than that of the OFDM system (represented by curve 1101, 1201), and much lower than the OTFS system (represented by curves 1102, 1202).

12. Application Examples According to the Present Disclosure

The technology of the present disclosure can be applied to various scenarios and products.

For example, the electronic device 200 for a transmitting side or the electronic device 500 for a receiving side may be a user-side electronic device. The user-side electronic device can be realized as a mobile terminal (such as a smartphone, a tablet personal computer (PC), a notebook PC, a portable game terminal, a portable/encrypted dongle-type mobile router, and a digital camera apparatus) or an in-vehicle terminal (such as a car navigation device). The user-side electronic device may also be realized as a terminal (also referred to as a machine type communication (MTC) terminal) that performs machine-to-machine (M2M) communication. In addition, the user-side electronic device may be a wireless communication module (such as an integrated circuit module including a single die) mounted on each of the above terminals.

The electronic device 200 for a transmitting side or the electronic device 500 for a receiving side may also be realized as a control-side electronic device, for example, any type of base station, preferably, such as a macro gNB and a small gNB in 3GPP's 5G communication standard New Radio (NR) access technology. The small gNB may be a gNB covering a cell smaller than a macro cell, such as a pico gNB, a mico gNB, and a home (femto) gNB. Alternatively, the control device can be realized as any other type of base station, such as a NodeB and a base transceiver station (BTS). The control device may include: a main body (also referred to as a base station device) configured to control wireless communication, and one or more remote wireless heads (RRHs) disposed in a different place from the main body.

12-1. Application Examples of Electronic Devices on the Control-Device Side

First Application Example

It should be understood that the term base station in this disclosure has the full breadth of its ordinary meaning and includes at least a wireless communication station that is used as a portion of a wireless communication system or a radio system to facilitate communication. Examples of the base station can be, for example but not limited to the following: the base station can be either or both of a base transceiver station (BTS) and a base station controller (BSC) in the GSM system, and can be either or both of a radio network controller (RNC) and NodeB in the WCDMA system, can be eNBs in the LTE and LTE-Advanced systems, or can be corresponding network nodes in future communication systems (e.g., a gNB that may appear in the 5G communication systems, etc.). In D2D, M2M, and V2V communication scenarios, a logical entity that has a control function for communication may also be called a base station. In a cognitive radio communication scenario, a logical entity that plays the role of spectrum coordination can also be called a base station.

FIG. 13 is a block diagram showing a first example of a schematic configuration of an electronic device on control device-side to which the technology of the present disclosure can be applied. The control-side electronic device may be the electronic device 200 for a transmitting side according to an embodiment of the present disclosure, or may be the electronic device 500 for a receiving side according to an embodiment of the present disclosure. Wherein, the electronic device 200 or the electronic device 500 is shown as gNB 800. Wherein, gNB 800 includes multiple antennas 810 and base station device 820. The base station device 820 and each antenna 810 may be connected to each other via an RF cable.

Each of the antennas 810 includes multiple antenna elements (such as multiple antenna array elements included in a multiple input multiple output (MIMO) antenna), and is used for the base station device 820 to transmit and receive wireless signals. As shown in FIG. 13, the gNB 800 may include the multiple antennas 810. For example, the multiple antennas 810 may be compatible with multiple frequency bands used by the gNB 800. FIG. 13 shows an example in which the gNB 800 includes multiple antennas 810 that can be used to implement the multi-carrier system described in the embodiments of the present disclosure.

The base station device 820 includes a controller 821, a memory 822, a network interface 823, and a wireless communication interface 825.

The controller 821 may be, for example, a CPU or a DSP, and operates various functions of higher layers of the base station device 820. For example, controller 821 generates a data packet from data in signals processed by the wireless communication interface 825, and transfers the generated packet via the network interface 823. Controller 821 may bundle data from multiple base band processors to generate the bundled packet and transfer the generated bundled packet. The controller 821 may have logic functions of performing control such as radio resource control, radio bearer control, mobility management, admission control, and scheduling. This control may be performed in conjunction with an gNB or a core network node in the vicinity. The memory 822 includes RAM and a ROM, and stores program that is executed by the controller 821, and various types of control data (such as a terminal list, transmission power data, and scheduling data).

Network interface 823 is a communication interface for connecting base station device 820 to core network 824. Controller 821 can communicate with a core network node or another gNB via network interface 823. In this case, the gNB 800, and the core network node or other gNBs may be connected to each other through a logical interface (such as an S1 interface and an X2 interface). Network interface 823 may also be a wired communication interface or a wireless communication interface for radio backhaul. If network interface 823 is a wireless communication interface, the network interface 823 may use a higher frequency band for wireless communication than a frequency band used by the wireless communication interface 825.

The wireless communication interface 825 supports any cellular communication scheme (such as Long Term Evolution (LTE) and LTE-Advanced), and provides a wireless connection to terminals located in a cell of the gNB 800 via the antenna 810. The wireless communication interface 825 may typically include, for example, a baseband (BB) processor 826 and an RF circuit 827. The BB processor 826 may perform, for example, encoding/decoding, modulation/demodulation, and multiplexing/demultiplexing, and performs various types of signal processing of layers (such as L1, Medium Access Control (MAC), Radio Link Control (RLC), and Packet Data Convergence Protocol (PDCP)). The BB processor 826 may have a part or all of the above-described logic functions instead of the controller 821. The BB processor 826 may be a memory that stores a communication control program, or a module that includes a processor and related circuit configured to execute the program. Updating the program may allow the functions of the BB processor 826 to be changed.

The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 13, the wireless communication interface 825 may include the multiple BB processors 826. For example, the multiple BB processors 826 may be compatible with multiple frequency bands used by gNB 800. As shown in FIG. 13, the wireless communication interface 825 may include the multiple RF circuits 827. For example, the multiple RF circuits 827 may be compatible with multiple antenna elements. Although FIG. 13 shows an example in which the wireless communication interface 825 includes multiple BB processors 826 and multiple RF circuits 827, the wireless communication interface 825 may also include a single BB processor 826 or a single RF circuit 827.

In the gNB 800 shown in FIG. 13, one or more components included in the processing circuit 203 described with reference to FIG. 2 or the processing circuit 503 described with reference to FIG. 5 can be implemented in the wireless communication interface 825. Alternatively, at least a part of these components can be implemented in the controller 821. For example, the gNB 800 contains a portion (e.g., the BB processor 826) or the whole of wireless communication interface 825, and/or a module including controller 821, and one or more components can be implemented in the module. In this case, the module may store a program for allowing the processor to function as one or more components (in other words, a program for allowing the processor to perform the operation of one or more components), and may execute the program. As another example, a program for allowing the processor to function as one or more components can be installed in the gNB 800, and the wireless communication interface 825 (for example, the BB processor 826) and/or the controller 821 can execute the program. As described above, as an apparatus including one or more components, a gNB 800, a base station device 820, or a module may be provided, and a program for allowing the processor to function as one or more components may be provided. In addition, a readable medium in which the program is recorded may be provided.

In addition, in the gNB 800 shown in FIG. 13, the communication unit 201 described with reference to FIG. 2 or the communication unit 501 described with reference to FIG. 5 can be implemented in the wireless communication interface 825 (for example, the RF circuit 827). In addition, the communication unit 201 or the communication unit 501 can be implemented in the controller 821 and/or the network interface 823.

Second Application Example

FIG. 14 is a block diagram showing a second example of a schematic configuration of an electronic device on control device-side to which the technology of the present disclosure can be applied. The control-side electronic device may be the electronic device 200 for a transmitting side according to an embodiment of the present disclosure, or may be the electronic device 500 for a receiving side according to an embodiment of the present disclosure. The control device may include, for example, the electronic device 200 or the electronic device 500 for downlink transmission. Wherein, the electronic device 200 or 500 is shown as a gNB 830. The gNB 830 includes one or more antennas 840, a base station device 850, and a RRH 860. The RRH 860 and each antenna 840 may be connected to each other via an RF cable. The base station device 850 and the RRH 860 may be connected to each other via a high-speed line such as an optical fiber cable.

Each of the antennas 840 includes a single or multiple antenna elements (such as multiple antenna elements included in a MIMO antenna) and is used for the RRH 860 to transmit and receive wireless signals. As shown in FIG. 14, the gNB 830 may include multiple antennas 840. For example, the multiple antennas 840 may be compatible with multiple frequency bands used by the gNB 830. FIG. 14 shows an example in which the gNB 830 includes multiple antennas 840 that can be used to implement the multi-carrier system described in the embodiments of the present disclosure.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 13.

The wireless communication interface 855 supports any cellular communication scheme (such as LTE and LTE-advanced), and provides wireless communication to terminals located in a sector corresponding to the RRH 860 via the RRH 860 and the antenna 840. The wireless communication interface 855 may generally include, for example, a BB processor 856. The BB processor 856 is the same as the BB processor 826 described with reference to FIG. 13 except that the BB processor 856 is connected to the RF circuit 864 of the RRH 860 via the connection interface 857. As shown in FIG. 14, the wireless communication interface 855 may include multiple BB processors 856. For example, the multiple BB processors 856 may be compatible with multiple frequency bands used by gNB 830. Although FIG. 14 shows an example in which the wireless communication interface 855 includes multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high-speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above high-speed line.

The wireless communication interface 863 transmits and receives wireless signals via the antenna 840. The wireless communication interface 863 may generally include, for example, an RF circuit 864. The RF circuit 864 may include, for example, a mixer, a filter, and an amplifier, and transmit and receive wireless signals via the antenna 840. As shown in FIG. 14, the wireless communication interface 863 may include multiple RF circuits 864. For example, the multiple RF circuits 864 may support multiple antenna elements. Although FIG. 14 shows an example in which the wireless communication interface 863 includes multiple RF circuits 864, the wireless communication interface 863 may also include a single RF circuit 864.

In the gNB 830 shown in FIG. 14, one or more components included in the processing circuit 203 described with reference to FIG. 2 or the processing circuit 503 described with reference to FIG. 5 can be implemented in the wireless communication interface 855. Alternatively, at least a part of these components can be implemented in the controller 851. For example, the gNB 830 contains a portion (for example, the BB processor 856) or the whole of wireless communication interface 855, and/or a module including the controller 851, and one or more components can be implemented in the module. In this case, the module may store a program for allowing the processor to function as one or more components (in other words, a program for allowing the processor to perform the operation of one or more components), and may execute the program. As another example, a program for allowing the processor to function as one or more components can be installed in the gNB 830, and the wireless communication interface 855 (for example, the BB processor 856) and/or the controller 851 can execute the program. As described above, as an apparatus including one or more components, a gNB 830, a base station device 850, or a module may be provided, and a program for allowing the processor to function as one or more components may be provided. In addition, a readable medium in which the program is recorded may be provided.

In addition, in the gNB 830 shown in FIG. 14, the communication unit 201 described with reference to FIG. 2 or the communication unit 501 described with reference to FIG. 5 can be implemented in the wireless communication interface 855 (for example, the BB circuit 856). In addition, the communication unit 201 or the communication unit 501 can be implemented in the controller 851 and/or the network interface 853.

12-2. Application Examples of Electronic Devices on the User Side

First Application Example

FIG. 15 is a block diagram showing an example of a schematic configuration of a smartphone 900 to which the technology of the present disclosure can be applied. The smartphone 900 may be the electronic device 200 for the transmitting side according to an embodiment of the present disclosure, or may be the electronic device 500 for the receiving side according to an embodiment of the present disclosure. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switch 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light emitting diode (OLED) display, and displays an output image of the smartphone 900. The speaker 911 converts audio signals that are output from the smartphone 900 to sounds. The wireless communication interface 912 supports any cellular communication scheme (such as LTE and LTE-Advanced) and performs wireless communication. The wireless communication interface 912 may typically include, for example, a BB processor 913 and an RF circuit 914. The BB processor 913 may perform, for example, encoding/decoding, modulation/demodulation, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication interface 912 may be one chip module that has the BB processor 913 and the RF circuit 914 integrated thereon. As shown in FIG. 15, the wireless communication interface 1512 may include multiple BB processors 1513 and multiple RF circuits 1514. Although FIG. 15 shows an example in which the wireless communication interface 1512 includes multiple BB processors 1513 and multiple RF circuits 1514, the wireless communication interface 1512 may also include a single BB processor 1513 or a single RF circuit 914.

Furthermore, in addition to a cellular communication scheme, the wireless communication interface 912 may support another type of wireless communication scheme, such as a short-range wireless communication scheme, a near field communication scheme, and a wireless local area network (LAN) scheme. In this case, the wireless communication interface 912 may include a BB processor 913 and an RF circuit 914 for each wireless communication scheme.

Each of the antenna switches 915 switches connection destinations of the antenna 916 among multiple circuits (for example, circuits for different wireless communication schemes) included in the wireless communication interface 912.

Each of the antennas 916 includes a single or multiple antenna elements (such as multiple antenna array elements included in a MIMO antenna), and is used for the wireless communication interface 912 to transmit and receive wireless signals. As shown in FIG. 15, the smartphone 900 may include multiple antennas 916. Although FIG. 15 shows an example in which the smartphone 900 includes multiple antennas 916, the smartphone 900 may also include a single antenna 916.

In addition, the smartphone 900 may include an antenna 916 for each wireless communication scheme. In this case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 15 via feeder lines, which are partially shown as dashed lines in the figure. The auxiliary controller 919 operates a minimum necessary function of the smartphone 900, for example, in a sleep mode.

In the smartphone 900 shown in FIG. 15, one or more components included in the processing circuits 203, 503 described with reference to FIG. 2 or 5 can be implemented in the wireless communication interface 912. Alternatively, at least a part of these components can be implemented in the processor 901 or the auxiliary controller 919. As an example, the smartphone 900 contains a portion (e.g., the BB processor 913) or the whole of the wireless communication interface 912, and/or a module including the processor 901 and/or the auxiliary controller 919, and one or more components can be implemented in the module. In this case, the module can store a program for allowing the processor to function as one or more components (in other words, a program for allowing the processor to perform the operation of one or more components), and may execute the program. As another example, a program for allowing the processor to function as one or more components can be installed in the smartphone 900, and the wireless communication interface 912 (for example, the BB processor 913), the processor 901, and/or the auxiliary controller 919 can execute the program. As described above, as an apparatus including one or more components, a smartphone 900 or a module may be provided, and a program for allowing the processor to function as one or more components may be provided. In addition, a readable medium in which the program is recorded may be provided.

In addition, in the smartphone 900 shown in FIG. 15, for example, the communication unit 201 or 501 described with reference to FIG. 2 or 5 can be implemented in the wireless communication interface 912 (for example, the RF circuit 914).

Second Application Example

FIG. 16 is a block diagram showing an example of a schematic configuration of a car navigation device 920 to which the technology of the present disclosure can be applied. The car navigation device 920 may be the electronic device 200 for a transmitting side according to an embodiment of the present disclosure, or may be the electronic device 500 for a receiving side according to an embodiment of the present disclosure. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls the navigation function and other functions of the car navigation device 920. The memory 922 includes RAM and ROM, and stores data and programs that are executed by the processor 921.

The GPS module 924 uses GPS signals received from a GPS satellite to measure a position (such as latitude, longitude, and altitude) of the car navigation device 920. The sensor 925 may include a group of sensor, such as a gyro sensor, a geomagnetic sensor, and a barometric sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives, and operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme (such as LTE and LTE-Advanced) and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication interface 933 may also be one chip module having the BB processor 934 and the RF circuit 935 integrated thereon. As shown in FIG. 16, the wireless communication interface 933 may include the multiple BB processors 934 and the multiple RF circuits 935. Although FIG. 16 shows an example in which the wireless communication interface 933 includes multiple BB processors 934 and multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme, such as a short-distance wireless communication scheme, a near-field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna) and is used for the wireless communication interface 933 to transmit and receive wireless signals. As shown in FIG. 16, the car navigation device 920 may include the multiple antennas 937. Although FIG. 16 illustrates an example in which the car navigation device 920 includes multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to each block of the car navigation device 920 shown in FIG. 16 via a feeder that are partially shown as dotted lines in the figure. The battery 938 accumulates power supplied from the vehicle.

In the car navigation device 920 shown in FIG. 16, one or more components included in the processing circuit 203 or 503 described with reference to FIG. 2 or 5 can be implemented in the wireless communication interface 933. Alternatively, at least a part of these components can be implemented in the processor 921. As an example, the car navigation device 920 contains a portion (e.g., the BB processor 934) or the whole of the wireless communication interface 933, and/or a module including the processor 921, and one or more components can be implemented in the module. In this case, the module may store a program for allowing the processor to function as one or more components (in other words, a program for allowing the processor to perform the operation of one or more components), and may execute the program. As another example, a program for allowing the processor to function as one or more components can be installed in the car navigation device 920, and the wireless communication interface 933 (for example, the BB processor 934) and/or the processor 921 can execute the procedure. As described above, as a apparatus including one or more components, a car navigation device 920 or a module may be provided, and a program for allowing the processor to function as one or more components may be provided. In addition, a readable medium in which the program is recorded may be provided.

In addition, in the car navigation device 920 shown in FIG. 16, for example, the communication unit 201 or 501 described with reference to FIG. 2 or 5 can be implemented in the wireless communication interface 933 (for example, the RF circuit 935).

The technology of the present disclosure may also be implemented as an in-vehicle system (or vehicle) 940 including one or more blocks of a car navigation device 920, an in-vehicle network 941, and a vehicle module 942. The vehicle module 942 generates vehicle data (such as vehicle speed, engine speed, and failure information), and outputs the generated data to the in-vehicle network 941.

In addition, a readable medium in which the program is recorded may be provided. Therefore, the present disclosure also relates to a computer-readable storage medium having a program stored thereon, the program including instructions that are used to implement the aforementioned communication method when loaded and executed by a processor such as a processing circuit or a controller.

This disclosure also discloses at least the following solutions:

Solution 1. An electronic device, characterized in that, the electronic device comprising:

a processing circuit, configured to: perform a pre-processing operation on a first one-dimensional sequence of modulation symbols, the pre-processing operation including: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the dimension-decreasing conversion is an inverse process of the dimension-increasing conversion; and transmit the second one-dimensional sequence of modulation symbols.

Solution 2. The electronic device of Solution 1, wherein performing a dimension-increasing conversion to convert the first one-dimensional sequence of modulation symbols into the first multi-dimensional modulation symbol block includes: sequentially populating, on a column-by-column basis, each respective column of the first multi-dimensional modulation symbol block with the first one-dimensional sequence of modulation symbols; or sequentially populating, on a row-by-row basis, each respective row of the first multi-dimensional modulation symbol block with the first one-dimensional sequence of modulation symbols.

Solution 3. The electronic device of one of Solution 1 or 2, wherein the first transformation is an invertible transformation.

Solution 4. The electronic device of Solution 3, wherein the first transformation is a linear transformation.

Solution 5. The electronic device of Solution 4, wherein the first transformation is one of multi-dimensional Discrete Symplectic Fourier Transform, multi-dimensional Discrete Cosine Transform, or multi-dimensional Wavelet Transform.

Solution 6. The electronic device of Solution 5, wherein: the first multi-dimensional modulation symbol block and the second multi-dimensional modulation symbol block are a first two-dimensional modulation symbol block and a second two-dimensional modulation symbol block, respectively, and the first transformation includes one of: applying a one-dimensional Fourier transform to each row of the first two-dimensional modulation symbol block to obtain an intermediate two-dimensional modulation symbol block, and then applying a one-dimensional inverse Fourier transform to each column of the intermediate two-dimensional modulation symbol block to obtain the second two-dimensional modulation symbol block; or applying a one-dimensional inverse Fourier transform to each column of the first two-dimensional modulation symbol block to obtain an intermediate two-dimensional modulation symbol block, and then applying a one-dimensional Fourier transform to each row of the intermediate two-dimensional modulation symbol block to obtain the second two-dimensional modulation symbol block.

Solution 7. The electronic device of one of Solution 1 or 2, wherein: the second one-dimensional sequence of modulation symbols are transmitted with a multi-carrier system.

Solution 8. The electronic device of Solution 7, wherein the multi-carrier system is an OFDM system, and the first one-dimensional sequence of modulation symbols correspond to a group of complex modulation symbols that are to be transmitted on multiple subcarriers within one OFDM symbol interval, and the processing circuit is configured to perform the OFDM modulation on the second one-dimensional sequence of modulation symbols so as to complete radio transmission of the group of complex modulation symbols within one OFDM symbol interval.

Solution 9. The electronic device of one of Solution 1 or 2, wherein the processing circuit is further configured to: before the pre-processing operation is performed, determine whether the pre-processing operation should be enabled.

Solution 10. The electronic device of Solution 9, wherein the processing circuit is further configured to: determine whether the pre-processing operation should be enabled, at least based on a channel condition or an application scenario.

Solution 11. The electronic device of Solution 10, wherein the channel condition includes at least the intensity of the Doppler effect of the channel.

Solution 12. The electronic device of Solution 11, wherein the application scenario includes at least one of high-speed train communication, air vehicle communication, or satellite communication.

Solution 13. The electronic device of Solution 9, wherein the processing circuit is further configured to: transmit indication information that at least indicates whether the pre-processing operation is enabled.

Solution 14. The electronic device of Solution 13, wherein the indication information further includes at least one of the following: a dimensional parameter of the first multi-dimensional modulation symbol block; sizes of dimensions of the first multi-dimensional modulation symbol block; and a type of the first transformation.

Solution 15. The electronic device of Solution 13, wherein the indication information is included in downlink control information DCI or a radio resource control RRC message.

Solution 16. An electronic device, characterized in that, the electronic device comprising: a processing circuit, configured to: acquire a first one-dimensional sequence of modulation symbols; and perform a post-processing operation on the first one-dimensional sequence of modulation symbols, the post-processing operation including: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the dimension-decreasing conversion is an inverse process of the dimension-increasing conversion.

Solution 17. The electronic device of Solution 16, wherein the first one-dimensional sequence of modulation symbols is transmitted with a multi-carrier system.

Solution 18. The electronic device of Solution 17, wherein the multi-carrier system is an OFDM system, and the first one-dimensional sequence of modulation symbols correspond to a group of complex modulation symbols received on multiple subcarriers within one OFDM symbol interval, the processing circuit is configured to perform OFDM demodulation on the received radio signal to acquire the first one-dimensional sequence of modulation symbols.

Solution 19. The electronic device of one of claims 16-17, wherein the processing circuit is further configured to: before the post-processing operation is performed, determine whether the post-processing operation should be enabled.

Solution 20. The electronic device of Solution 19, wherein the processing circuit is further configured to: determine whether the post-processing operation should be enabled based on the received indication information, the indication information including at least information about whether the post-processing operation should be enabled.

Solution 21. The electronic device of Solution 20, wherein the processing circuit is further configured to: acquire the indication information from downlink control information DCI or a radio resource control RRC message.

Solution 22. The electronic device of Solution 19, wherein the processing circuit is further configured to: send a request to enable the post-processing operation at least based on a channel condition or an application scenario.

Solution 23. The electronic device of one of claims 16-17, wherein the processing circuit is further configured to: equalize the equivalent transmission channel containing the pre-processing operation for acquiring the received the first one-dimensional sequence of modulation symbols and the post-processing operation.

Solution 24. A communication method, characterized in that, the method comprising: performing a pre-processing operation on a first one-dimensional sequence of modulation symbols, the pre-processing operation including: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the dimension-decreasing conversion is an inverse process of the dimension-increasing conversion; and transmitting the second one-dimensional sequence of modulation symbols.

Solution 25. The communication method of Solution 24, wherein the second one-dimensional sequence of modulation symbols is transmitted with a multi-carrier system.

Solution 26. The communication method of Solution 25, wherein the multi-carrier system is an OFDM system, and the first one-dimensional sequence of modulation symbols correspond to a group of complex modulation symbols that are to be transmitted on multiple subcarriers within one OFDM symbol interval, transmitting the second one-dimensional sequence of modulation symbols includes performing the OFDM modulation on the second one-dimensional sequence of modulation symbols so as to complete radio transmission of the group of complex modulation symbols within one OFDM symbol interval.

Solution 27. A communication method, characterized in that, the method comprising: acquiring a first one-dimensional sequence of modulation symbols; and performing a post-processing operation on the first one-dimensional sequence of modulation symbols, the post-processing operation including: performing a dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a dimension-decreasing conversion to convert the second multi-dimensional modulation symbol block into a second one-dimensional sequence of modulation symbols, wherein the dimension-decreasing conversion is an inverse process of the dimension-increasing conversion.

Solution 28. The communication method of Solution 27, wherein the first one-dimensional sequence of modulation symbols is transmitted with a multi-carrier system.

Solution 29. The communication method of Solution 28, wherein the multi-carrier system is an OFDM system, and acquiring the first one-dimensional sequence of modulation symbols includes performing OFDM demodulation on the received radio signal to acquire the first one-dimensional sequence of modulation symbols, wherein the first one-dimensional sequence of modulation symbols correspond to a group of complex modulation symbols received on multiple subcarriers within one OFDM symbol interval.

Solution 30. A communication method, characterized in that, the method comprising: performing a pre-processing operation on a first one-dimensional sequence of modulation symbols, the pre-processing operation including: performing a first dimension-increasing conversion to convert the first one-dimensional sequence of modulation symbols into a first multi-dimensional modulation symbol block; transforming the first multi-dimensional modulation symbol block into a second multi-dimensional modulation symbol block with a first transformation, wherein the first transformation couples each symbol in the first multi-dimensional modulation symbol block with each other; and performing a first dimension-decreasing conversion to convert the second multi-dimensional modulation symbol block into a second one-dimensional sequence of modulation symbols, wherein the first dimension-decreasing conversion is an inverse process of the first dimension-increasing conversion; and transmitting the second one-dimensional sequence of modulation symbols, acquiring the second one-dimensional sequence of modulation symbols; and performing a post-processing operation on the second one-dimensional sequence of modulation symbols, the post-processing operation including: performing a second dimension-increasing conversion to convert the second one-dimensional sequence of modulation symbols into a third multi-dimensional modulation symbol block; transforming the third multi-dimensional modulation symbol block into a fourth multi-dimensional modulation symbol block with a second transformation, wherein the second transformation couples each symbol in the third multi-dimensional modulation symbol block with each other; and performing a second dimension-decreasing conversion to convert the fourth multi-dimensional modulation symbol block into a third one-dimensional sequence of modulation symbols, wherein the second dimension-decreasing conversion is an inverse process of the second dimension-increasing conversion.

Solution 31. A computer-readable storage medium having a computer program stored thereon, characterized in that, the computer program, when loaded and executed by a processor, used to embody the method according to any one of Solution 24-30.

Although some specific embodiments of the present disclosure have been described in detail, those skilled in the art should understand that the above-described embodiments are merely illustrative and do not limit the scope of the present disclosure. Those skilled in the art should understand that the above-described embodiments may be combined, modified, or replaced without departing from the scope and essence of the present disclosure. The scope of the present disclosure is defined by the appended claims.

What is claimed is:

1. An electronic device, characterized in that, the electronic device comprising:
   a processing circuit, configured to:
     perform a pre-processing operation on a first one-dimensional sequence of modulation symbols, the pre-processing operation including:
       performing a dimension-increasing conversion to convert the first one-dimensional sequence of modulation symbols into a first multi-dimensional modulation symbol block;
       transforming the first multi-dimensional modulation symbol block into a second multi-dimensional modulation symbol block with a first transformation, wherein the first transformation couples each symbol in the first multi-dimensional modulation symbol block with each other; and
       performing a dimension-decreasing conversion to convert the second multi-dimensional modulation symbol block into a second one-dimensional sequence of modulation symbols, wherein the dimension-decreasing conversion is an inverse process of the dimension-increasing conversion; and
     transmit the second one-dimensional sequence of modulation symbols.

2. The electronic device of claim 1, wherein performing a dimension-increasing conversion to convert the first one-dimensional sequence of modulation symbols into the first multi-dimensional modulation symbol block includes:
   sequentially populating, on a column-by-column basis, each respective column of the first multi-dimensional modulation symbol block with the first one-dimensional sequence of modulation symbols; or
   sequentially populating, on a row-by-row basis, each respective row of the first multi-dimensional modulation symbol block with the first one-dimensional sequence of modulation symbols.

3. The electronic device of claim 1, wherein:
   the first multi-dimensional modulation symbol block and the second multi-dimensional modulation symbol block are a first two-dimensional modulation symbol block and a second two-dimensional modulation symbol block, respectively, and
   the first transformation includes one of:
     applying a one-dimensional Fourier transform to each row of the first two-dimensional modulation symbol block to obtain an intermediate two-dimensional modulation symbol block, and then applying a one-dimensional inverse Fourier transform to each column of the intermediate two-dimensional modulation symbol block to obtain the second two-dimensional modulation symbol block; or
     applying a one-dimensional inverse Fourier transform to each column of the first two-dimensional modulation symbol block to obtain an intermediate two-dimensional modulation symbol block, and then applying a one-dimensional Fourier transform to each row of the intermediate two-dimensional modulation symbol block to obtain the second two-dimensional modulation symbol block.

4. The electronic device of claim 1, wherein:
   the second one-dimensional sequence of modulation symbols are transmitted with a multi-carrier system.

5. The electronic device of claim 4, wherein the multi-carrier system is an OFDM system, and the first one-dimensional sequence of modulation symbols correspond to a group of complex modulation symbols that are to be transmitted on multiple subcarriers within one OFDM symbol interval, and
   the processing circuit is configured to perform an OFDM modulation on the second one-dimensional sequence of modulation symbols so as to complete radio transmission of the group of complex modulation symbols within one OFDM symbol interval.

6. The electronic device of claim 1, wherein the processing circuit is further configured to:
   before the pre-processing operation is performed, determine whether the pre-processing operation should be enabled.

7. The electronic device of claim 6, wherein the processing circuit is further configured to:
   determine whether the pre-processing operation should be enabled, at least based on a channel condition or an application scenario.

8. The electronic device of claim 6, wherein the processing circuit is further configured to: transmit indication information that at least indicates whether the pre-processing operation is enabled.

9. The electronic device of claim 8, wherein the indication information further includes at least one of the following: a dimensional parameter of the first multi-dimensional modulation symbol block; sizes of dimensions of the first multi-dimensional modulation symbol block; and a type of the first transformation.

10. An electronic device, characterized in that, the electronic device comprising:
    a processing circuit, configured to:
      acquire a first one-dimensional sequence of modulation symbols; and
      perform a post-processing operation on the first one-dimensional sequence of modulation symbols, the post-processing operation including:
        performing a dimension-increasing conversion to convert the first one-dimensional sequence of modulation symbols into a first multi-dimensional modulation symbol block;
        transforming the first multi-dimensional modulation symbol block into a second multi-dimensional modulation symbol block with a first transformation, wherein the first transformation couples each symbol in the first multi-dimensional modulation symbol block with each other; and
        performing a dimension-decreasing conversion to convert the second multi-dimensional modulation symbol block into a second one-dimensional sequence of modulation symbols, wherein the dimension-decreasing conversion is an inverse process of the dimension-increasing conversion.

11. The electronic device of claim 10, wherein the first one-dimensional sequence of modulation symbols are transmitted with a multi-carrier system.

12. The electronic device of claim 11, wherein the multi-carrier system is an OFDM system, and the first one-dimensional sequence of modulation symbols correspond to a group of complex modulation symbols received on multiple subcarriers within one OFDM symbol interval, the processing circuit is configured to perform OFDM demodulation on the received radio signal to acquire the first one-dimensional sequence of modulation symbols.

13. The electronic device of claim 10, wherein the processing circuit is further configured to: before the post-processing operation is performed, determine whether the post-processing operation should be enabled.

14. The electronic device of claim 13, wherein the processing circuit is further configured to: determine whether the post-processing operation should be enabled based on the received indication information, the indication information including at least information about whether the post-processing operation should be enabled.

15. The electronic device of claim 14, wherein the processing circuit is further configured to: acquire the indication information from downlink control information DCI or a radio resource control RRC message.

16. The electronic device of claim 13, wherein the processing circuit is further configured to: send a request to enable the post-processing operation at least based on a channel condition or an application scenario.

17. The electronic device of claim 10, wherein the processing circuit is further configured to: equalize equivalent transmission channels containing the pre-processing operation for acquiring the received first one-dimensional sequence of modulation symbols and the post-processing operation.

18. A communication method, characterized in that, the method comprising:
  performing a pre-processing operation on a first one-dimensional sequence of modulation symbols, the pre-processing operation including:
    performing a first dimension-increasing conversion to convert the first one-dimensional sequence of modulation symbols into a first multi-dimensional modulation symbol block;
    transforming the first multi-dimensional modulation symbol block into a second multi-dimensional modulation symbol block with a first transformation, wherein the first transformation couples each symbol in the first multi-dimensional modulation symbol block with each other; and
    performing a first dimension-decreasing conversion to convert the second multi-dimensional modulation symbol block into a second one-dimensional sequence of modulation symbols, wherein the first dimension-decreasing conversion is an inverse process of the first dimension-increasing conversion; and
  transmitting the second one-dimensional sequence of modulation symbols,
  acquiring the second one-dimensional sequence of modulation symbols; and
  performing a post-processing operation on the second one-dimensional sequence of modulation symbols, the post-processing operation including:
    performing a second dimension-increasing conversion to convert the second one-dimensional sequence of modulation symbols into a third multi-dimensional modulation symbol block;
    transforming the third multi-dimensional modulation symbol block into a fourth multi-dimensional modulation symbol block with a second transformation, wherein the second transformation couples each symbol in the third multi-dimensional modulation symbol block with each other; and
    performing a second dimension-decreasing conversion to convert the fourth multi-dimensional modulation symbol block into a third one-dimensional sequence of modulation symbols, wherein the second dimension-decreasing conversion is an inverse process of the second dimension-increasing conversion.

19. The communication method of claim 18, wherein the second one-dimensional sequence of modulation symbols are transmitted with a multi-carrier system.

20. The communication method of claim 19, wherein the multi-carrier system is an OFDM system, and the first one-dimensional sequence of modulation symbols correspond to a group of complex modulation symbols that are to be transmitted on multiple subcarriers within one OFDM symbol interval, and the transmitting the second one-dimensional sequence of modulation symbols includes performing an OFDM modulation on the second one-dimensional sequence of modulation symbols so as to complete radio transmission of the group of complex modulation symbols within one OFDM symbol interval.

* * * * *